(12) United States Patent
Maeda

(10) Patent No.: US 10,233,047 B2
(45) Date of Patent: Mar. 19, 2019

(54) PRINTING SYSTEM IMPROVED IN SHEET DISCHARGE PROCESSING, METHOD OF CONTROLLING THE SAME, AND STORAGE MEDIUM

(71) Applicant: CANON KABUSHIKI KAISHA, Tokyo (JP)

(72) Inventor: Yuuki Maeda, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 106 days.

(21) Appl. No.: 14/817,665

(22) Filed: Aug. 4, 2015

(65) Prior Publication Data
US 2016/0039627 A1    Feb. 11, 2016

(30) Foreign Application Priority Data
Aug. 11, 2014   (JP) ................. 2014-163614

(51) Int. Cl.
*B65H 31/24* (2006.01)
*B65H 29/60* (2006.01)
(Continued)

(52) U.S. Cl.
CPC ............ *B65H 31/24* (2013.01); *B65H 29/60* (2013.01); *B65H 43/06* (2013.01); *G03G 15/502* (2013.01);
(Continued)

(58) Field of Classification Search
CPC ........ B65H 31/24; B65H 43/06; B65H 29/60; B65H 2301/4217; G06F 3/1207
(Continued)

(56) References Cited

U.S. PATENT DOCUMENTS 5,810,352 A * 9/1998 Kobayashi ............ B22C 1/162
   271/288
7,941,068 B2 * 5/2011 Kimura ............ G03G 15/5062
   399/405
(Continued)

FOREIGN PATENT DOCUMENTS

JP   02193865 A   7/1990
JP   H04209160 A  7/1992
(Continued)

OTHER PUBLICATIONS

Machine translation of JP 4-209160, retrieved Jun. 25, 2018 (Year: 1992).*
(Continued)

*Primary Examiner* — Michael C McCullough
(74) *Attorney, Agent, or Firm* — Rossi, Kimms & McDowell LLP

(57) ABSTRACT

A printing system capable of properly changing a content of a notification based on occurrence of a full state of a sheet in an output destination. A printing system which is able to output a sheet to any of a plurality of sheet stacking units includes a determining unit configured to determine whether a first setting for selecting a specific sheet stacking unit as an output destination of the sheet is performed or a second setting for automatically selecting any sheet stacking unit from among the plurality of sheet stacking units as the output destination is performed, a notification unit configured to perform a notification according to occurrence of a fully-stacked state in the output destination, and a control unit configured to change a content of the notification based on the determining by the determining unit.

6 Claims, 18 Drawing Sheets

(51) Int. Cl.
  *B65H 43/06* (2006.01)
  *G03G 15/00* (2006.01)
  *G03G 21/16* (2006.01)
  *G06F 3/12* (2006.01)

(52) U.S. Cl.
  CPC ......... *G03G 15/6552* (2013.01); *G03G 21/16* (2013.01); *G06F 3/1207* (2013.01); *G06F 3/1259* (2013.01); *G06F 3/1282* (2013.01); *G06F 3/1285* (2013.01); *B65H 2801/06* (2013.01); *G03G 2215/00603* (2013.01); *G03G 2221/16* (2013.01)

(58) Field of Classification Search
  USPC ......................................................... 271/298
  See application file for complete search history.

(56) References Cited

U.S. PATENT DOCUMENTS

| | | | |
|---|---|---|---|
| 8,167,308 B2 * | 5/2012 | Tanaka | B65H 29/60 |
| | | | 271/288 |
| 2007/0171455 A1 | 7/2007 | Tominaga | |
| 2010/0290088 A1 * | 11/2010 | Ito | G03G 15/55 |
| | | | 358/1.16 |

FOREIGN PATENT DOCUMENTS

| | | | |
|---|---|---|---|
| JP | 2004131247 A | 4/2004 |
| JP | 2007219495 A | 8/2007 |
| JP | 5079147 B2 | 11/2012 |

OTHER PUBLICATIONS

Office Action issued in Japanese Appln. No. 2014-163614 dated Apr. 17, 2018.

* cited by examiner

FIG. 6

Printer Driver

PRINTER
- PRINTER NAME: MFP 110 ▼ | [PROPERTY] 601
- STATUS: IDLING
- TYPE: XXXX YYYY
- PLACE: ZZZZ
- COMMENT:

☐ OUTPUT TO FILE

PRINTING RANGE
- ⦿ ALL
- ○ CURRENT PAGE    ○ SELECTED PART
- ○ DESIGNATED PAGES [    ]
- Designate page numbers in a manner separated by commas, as in 1, 3, 6, or designate a page range, as in 4-8.

NUMBER OF PRINTED COPIES
- NUMBER OF COPIES: [1] ▲▼
- ☑ PRINT IN UNITS OF COPIES

SCALING
- NUMBER OF PAGES PER ONE SHEET: [ONE PAGE ▼]
- SHEET SIZE DESIGNATION: [NONE ▼]

OBJECT TO BE PRINTED: [DOCUMENT ▼]
PRINT DESIGNATION: [ALL PAGES ▼]

[OK] 602    [CANCEL]

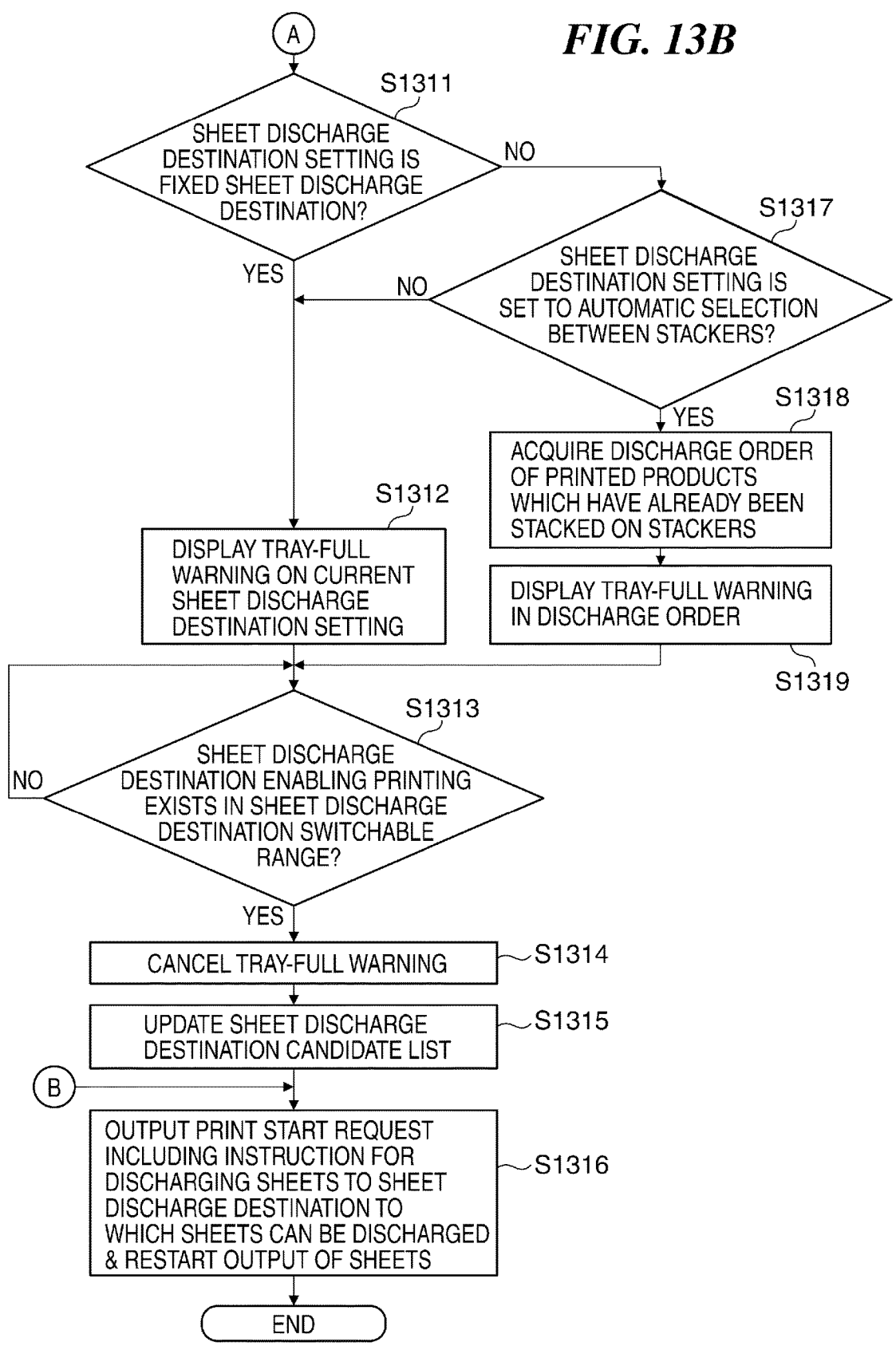

PRINTING SYSTEM IMPROVED IN SHEET DISCHARGE PROCESSING, METHOD OF CONTROLLING THE SAME, AND STORAGE MEDIUM

BACKGROUND OF THE INVENTION

Field of the Invention

The present invention relates to a printing system that is improved in sheet discharge processing, and more particularly to a technique that copes with, when a sheet processing apparatus becomes incapable of discharging sheets to a sheet discharge destination to make a printing apparatus incapable of performing print processing, a cause of the incapability of discharging sheets by an easy operation, to thereby cause the print processing to be restarted.

Description of the Related Art

A printing system that performs high-productivity high-efficiency printing such as POD (Print on Demand) is comprised of a large-scaled printing apparatus and various sheet processing apparatuses. As a sheet processing apparatus, there has been conventionally used a so-called stacker for stacking a large amount of printed products (printed sheets). By using the stacker, it is possible to perform continuous print processing, and thereby increase productivity.

There has been conventionally proposed, for example, a technique of automatically performing processing for immediately conveying a printed product from a stacker whenever a print job (hereinafter abbreviated to the "job") is completed (see Japanese Patent Laid-Open Publication No. 2007-219495). Further, there has been proposed a technique of controlling, when one of a plurality of stackers connected to a printing system becomes full, whether to cause sheets to be stacked on the other stacker or stop printing (see Japanese Patent No. 5079147). With these techniques, it is possible to more flexibly and continuously stack a large amount of printed products in the POD environment. Further, in a printing environment in which a plurality of stackers are shared by a plurality of operators, by allowing each operator to continue to use only one stacker, it is possible to prevent printed products to be handled by the other operators from being mixed in the operator's own printed products. Further, in a printing environment in which one operator exclusively uses a plurality of stackers, by configuring such that printed products are continuously output in a manner across the plurality of stackers, whereby it is possible to continuously perform printing over a longer time period.

On the other hand, in a printing system equipped with a plurality of stackers, in a case where each stacker is full of printed products stacked thereon, it is difficult for the operator of the printing system to determine the order of taking out printed products from the stackers. To cope with this, there has been proposed a technique of dividing sheet discharge devices into groups, for each input device for inputting a job or for each operator, and displaying input devices from which jobs were input for respective discharged printed products and each discharge device onto which sheets of each printed product were first discharged, in combination with each other (see Japanese Patent Laid-Open Publication No. H02-193865). By using this technique, in an environment in which one operator performs all of the operation sequence from inputting of a job to conveying of a printed product to a working apparatus used in the next step, even if a stacker from which the printed product is to be taken out is different each time, it is easy to determine a stacker from which the printed product should be taken out. Therefore, it is possible to reduce the possibility of making a mistake in selecting the printed product to be taken out.

However, in an environment, such as a POD environment, in which a large amount of printed products is continuously output, using stackers shared by a small number of operators, even if printed products to be taken out are displayed for each input device or for each operator, the advantageous effect thereof is small. Further, in the POD environment, there can be a case where a user who inputs jobs is a different person from a conveying operator who conveys the printed products of the jobs, and further there are a plurality of conveying operators. In this case, even when the order of taking out printed products is displayed, based on a time at which each printed product was output, for each user who input each associated job, it is difficult for each conveying operator to recognize a conveying order of printed products which he/she should convey, and hence there is a possibility that the operator makes a mistake in selecting the printed product to be taken out by him/her.

Further, even in a case where jobs are input by one user, independently of a job having caused a state of being tray-full i.e. a state in which a sheet discharge destination is full and is no longer able to receive discharged sheets, an irrelevant job could be sometimes executed earlier to cause a printed product of the irrelevant job to have been discharged in a discharge tray which is made tray-full by the first-mentioned job. In this case, even when the order of priorities of the printed product to be taken out is displayed only based on the output order, it is difficult for the user or the conveying operator to recognize which printed product should be taken out first. For example, a case can be envisaged where after a large amount of printed products is output earlier to a stacker which is a sheet discharge destination, a tray for stapling becomes tray-full during execution of a job set to stapling for a small lot. In this state, if the operator desires to continue the job set to stapling, it is necessary to immediately take out the printed product on the tray for stapling, but a warning (instruction) is displayed for taking out the printed products on the stacker, earlier in printing order, which causes the user or the conveying operator to misidentify a priority operation to be preferentially performed.

SUMMARY OF THE INVENTION

The present invention provides a technique of properly changing a content of a notification based on occurrence of a full state of a sheet in an output destination.

In a first aspect of the present invention, there is provided a printing system which is able to output a sheet to any of a plurality of sheet stacking units, comprising a determining unit configured to determine whether a first setting for selecting a specific sheet stacking unit as an output destination of the sheet is performed or a second setting for automatically selecting any sheet stacking unit from among the plurality of sheet stacking units as the output destination is performed, a notification unit configured to perform a notification according to occurrence of a fully-stacked state in the output destination, and a control unit configured to change a content of the notification based on the determining by the determining unit.

In a second aspect of the present invention, there is provided a control method for controlling a printing system which is able to output a sheet to any of a plurality of sheet stacking units, comprising determining whether a first setting for selecting a specific sheet stacking unit as an output destination of the sheet is performed or a second setting for automatically selecting any sheet stacking unit from among the plurality of sheet stacking units as the output destination is performed, performing a notification according to occurrence of a fully-stacked state in the output destination, and changing a content of the notification based on the determining.

In a third aspect of the present invention, there is provided a non-transitory computer readable storage medium for storing a computer program for controlling a printing system which is able to output a sheet to any of a plurality of sheet stacking units, the computer program comprising, a code to determine whether a first setting for selecting a specific sheet stacking unit as an output destination of the sheet is performed or a second setting for automatically selecting any sheet stacking unit from among the plurality of sheet stacking units as the output destination is performed, a code to perform a notification according to occurrence of a fully-stacked state in the output destination, and a code to change a content of the notification based on the determining.

Further features of the present invention will become apparent from the following description of exemplary embodiments (with reference to the attached drawings).

BRIEF DESCRIPTION OF THE DRAWINGS

FIG. 6 is a view of a printer driver setting screen for generating a job, provided in a server and a client which are included in the POD system shown in FIG. 1.

FIG. 13B is a continuation of FIG. 13A.

DESCRIPTION OF THE EMBODIMENTS

The present invention will now be described in detail below with reference to the accompanying drawings showing embodiments thereof. In this description, a printing environment, such as a POD environment, which is different from a general office environment is envisaged, and a printing system used in such a printing environment will be described. In the following description, the printing environment including the printing system according to an embodiment of the present invention is referred to as the "POD system". Note that this printing environment itself is one of the features of the present embodiment.

Figure 1:
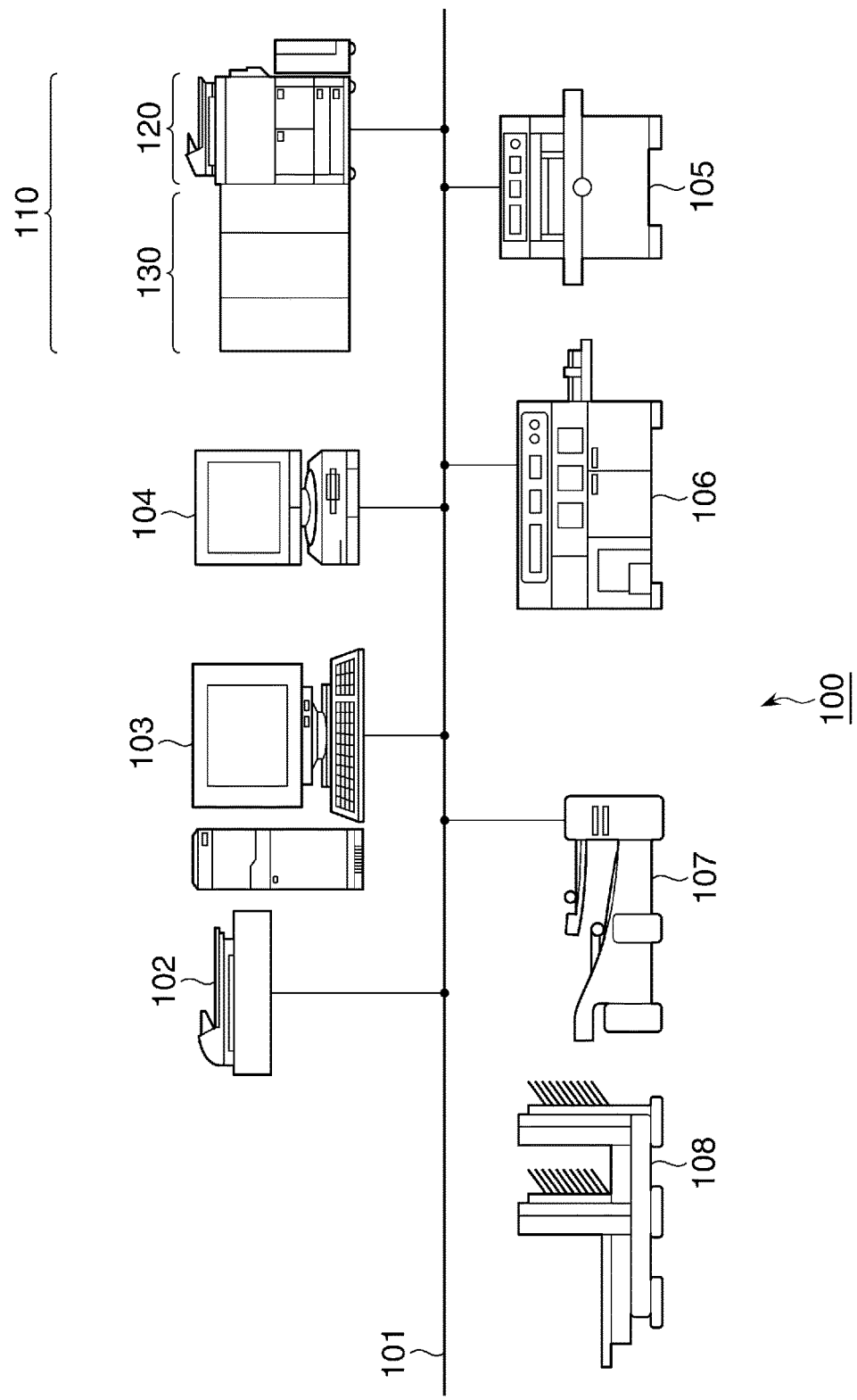
FIG. 1 is a schematic diagram of a POD system including a printing system according to an embodiment of the present invention.

FIG. 1 is a schematic diagram of the POD system, denoted by reference numeral 100, including the printing system, denoted by reference numeral 110, according to the present embodiment. The POD system 100 includes the printing system 110, a server 103, a client 104, a scanner 102, a cutting machine 105, a casing-in machine 106, and a paper folder 107, which are connected via a network 101. Further, the POD system 100 includes a saddle-stitch bookbinder 108. Note that the POD system 100 may include other devices. In the present embodiment, operators of the server 103 and the client 104 are each referred to as the user, and an operator of the printing system 110 is referred to as the operator. The user(s) and the operator are sometimes the same person, and are sometimes different persons.

In the present embodiment, the printing system 110 is comprised of a printing apparatus 120 and a sheet processing apparatus 130. The printing apparatus 120 is e.g. a multi-function peripheral (MFP) equipped with a plurality of functions, such as a copy function and a print function. However, this is not limitative, but the printing apparatus 120 may be a single-function type printing apparatus having only the copy function or the print function. Further, the printing apparatus 120 may be configured to be capable of performing color printing or only monochrome printing.

In the present embodiment, the cutting machine 105, the casing-in machine 106, the paper folder 107, and the saddle-stitch bookbinder 108 are respective types of the sheet processing apparatus, which are similar to the sheet processing apparatus 130 included in the printing system 110. That is, the cutting machine 105, the casing-in machine 106, the paper folder 107, and the saddle-stitch bookbinder 108 each are an apparatus that performs predetermined sheet processing on sheets discharged from the printing system 110.

The paper folder 107 performs processing for folding a printed product output from the printing system 110. The cutting machine 105 performs cutting processing for printed products discharged from the printing system 110, in units of sheet bundles each formed by a plurality of sheets. The saddle-stitching bookbinder 108 executes saddle-stitch binding processing on printed products output from the printing system 110. The casing-in machine 106 executes case-binding processing on printed products output from the printing system 110.

However, to cause each of these sheet processing apparatuses to perform predetermined sheet processing, it is necessary to cause the operator to perform an operation for taking printed products output from the printing system 110 out of an output section of the printing system 110, and setting the printed products on the sheet processing apparatus that is to execute the predetermined processing. Note that the output section is a first large-capacity stacker 361, referred to hereinafter, or the like. That is, to use the sheet processing apparatus other than the sheet processing apparatus 130 included in the printing system 110, an intervention operation is required to be performed by the operator after termination of a print job performed by the printing system 110.

On the other hand, when performing sheet processing, required by a job executed by the printing apparatus 120, using the sheet processing apparatus 130 as a component of the printing system 110, an intervention operation by the operator is not required to be performed after termination of the job executed by the printing apparatus 120. This is because, as described hereinafter with reference to FIG. 3, the printing system 110 is configured such that a sheet conveying path in the printing apparatus 120 is connected to a sheet conveying path in the sheet processing apparatus 130, and sheets are directly supplied from the printing apparatus 120 to the sheet processing apparatus 130. Thus, the sheet processing apparatus 130 and the printing apparatus 120 as components of the printing system 110 are in a relationship physically (mechanically) connected to each other.

Further, the printing apparatus 120 and the sheet processing apparatus 130 are each provided with a controller as a control unit, and are configured to be capable of performing mutual data communication between the controllers. Thus, the printing apparatus 120 and the sheet processing apparatus 130 are also in a relationship electrically connected to each other. However, in the present embodiment, as will be described hereinafter with reference to FIG. 2, the centralized control of the overall operation of the printing system 110 is performed by the controller, denoted by reference numeral 205, of the printing apparatus 120.

In the present embodiment, one or a plurality of sheets for which processing by the printing system 110 has been completed and which can be taken out by the operator from the printing system 110 are referred to as a printed product. Therefore, sheets stacked on a stacking section 365 of the first large-capacity stacker 361, described hereinafter with reference to FIG. 3, sheets transferred from the stacking section 365 to an eject tray 366, and sheets output onto an escape tray 367 are also each referred to as a printed product. Similarly, sheets stacked on a stacking section 375 of a second large-capacity stacker 371, sheets transferred from the stacking section 375 to an eject tray 376, and sheets output onto an escape tray 377 are also each referred to as a printed product. Further, sheets output to discharge trays 335 and 336 and a saddle-stitch bookbinding tray 337 of a finisher 334 are also each referred to as a printed product.

The server 103 and the client 104 each are, specifically, a computer, such as a personal computer (PC), and are an example of an external apparatus which instructs the printing system 110 to execute a job. The server 103 and the client 104 transmit job data including a print execution request to the printing apparatus 120 via the network 101. The controller 205 of the printing apparatus 120 performs centralized control of the printing system 110 based on the received job data, to thereby execute the requested job using the printing apparatus 120 and the sheet processing apparatus 130.

Figure 2:
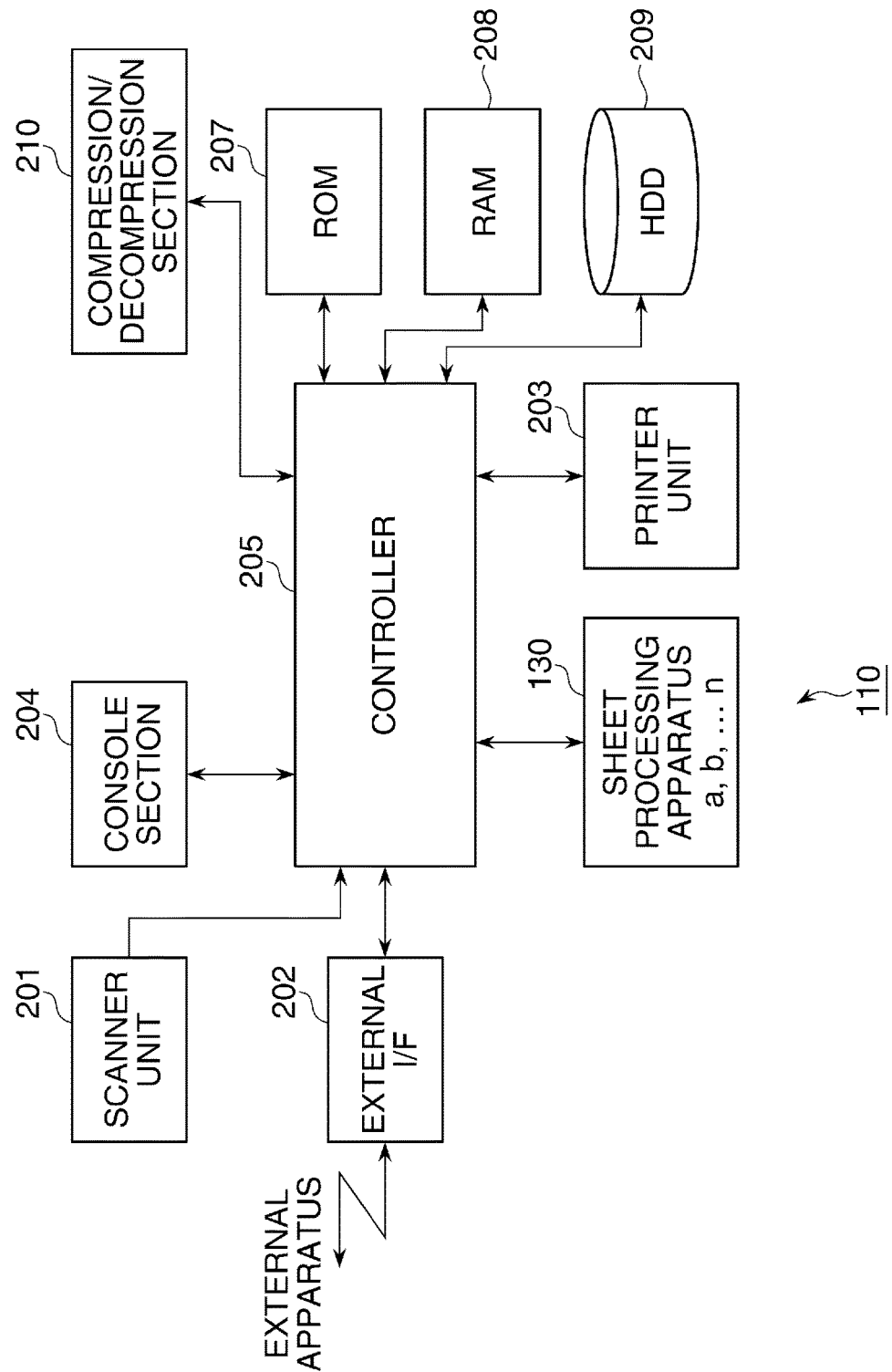
FIG. 2 is a schematic block diagram of a control system of the printing system appearing in FIG. 1.

FIG. 2 is a schematic block diagram of a control system of the printing system 110. In the present embodiment, out of the units included in the printing system 110, appearing in FIG. 2, all units other than the sheet processing apparatus 130 (strictly speaking, a sheet processing apparatus group which can be formed by a plurality of in-line sheet processing apparatuses) are all provided in the printing apparatus 120. In other words, the sheet processing apparatus 130 is provided as an option of the printing apparatus 120, which can be attached and removed to and from the printing apparatus 120. With this configuration, in the POD environment, it is possible to obtain an advantageous effect that by configuring the printing system 110 such that a necessary number of sheet processing apparatuses 130 are provided therein, it is possible to construct the system with the performance optimum to demands and uses.

The printing apparatus 120 includes a scanner unit 201, an external interface (I/F) 202, a printer unit 203, a console section 204, the controller 205, a ROM 207, a RAM 208, an HDD 209, and a compression/decompression section 210.

The printing apparatus 120 has a plurality of functions, such as a copy function, a print function, and a data transmission function. The copy function is a function of printing image data generated by the scanner unit 201, using the printer unit 203 and the HDD 209. The print function is a function of printing, using the printer unit 203 and the HDD 209, job data which is received from an external apparatus, such as the server 103 and the client 104, via the network 101 and the external interface 202. The data transmission function is a function of transmitting image data generated by the scanner unit 201 to an external apparatus, such as the server 103, via the external interface 202 and the network 101.

The scanner unit 201 reads an original image, and performs image processing on the read image data. The external interface 202 transmits and receives image data, job data, and so forth, to and from a facsimile machine, a network connection device, and an external apparatus. The compression/decompression section 210 performs processing by various compression methods, such as JBIG and JPEG, for compressing image data to be stored in the RAM 208 or the HDD 209, and inversely for decompressing the image data stored in the RAM 208 or the HDD 209. The HDD 209 is a large-capacity storage device, and is capable of storing image data to be printed of a plurality of jobs, which is received from the scanner unit 201 and the external interface 202, and compressed by the compression/decompression section 210. The printer unit 203 performs print processing based on job data stored in the HDD 209, for forming an image on a printing medium, such as a sheet.

The console section 204 includes a display section which is one of user interfaces equipped in the printing system 110. As the display section, one having a touch panel function is preferably used, and various settings on the printing system 110 can be made via the touch panel. Further, the console section 204 includes various switches and buttons for operating the printing apparatus 120. In a broad sense, a mouse, a keyboard, and a touch panel provided in the server 103 and the client 104, respectively, are also included in the user interfaces for operating the printing system 110. The console section 204 will be described hereinafter with reference to FIG. 5.

The controller 205 includes a CPU, and performs centralized control of processing and operations performed by the printing system 110. The ROM 207 is a read-only memory, and stores various programs which are executed by the controller 205 so as to control the overall operation of the printing system 110. The various programs include programs for a boot sequence, font information, and so forth of the printing system 110, and programs for performing various processes illustrated in flowcharts, described hereinafter. Also, the various programs include a display control program for causing various GUI screens including a GUI (Graphic User Interface), described hereinafter, to be displayed on the display section of the console section 204. Furthermore, the various programs include a program for performing an operation for interpreting PDL data received from an external apparatus, such as the server 103 and the client 104, via the external interface 202, and converting the PDL data into raster image data (bitmap image data). PDL stands for page description language.

The RAM 208 is a readable and writable memory, and temporarily stores image data transmitted from the scanner unit 201 and the external interface 202 via the controller 205, various programs, and setting information. Further, the RAM 208 is used as a work area when the controller 205 executes the programs. The controller 205 reads out a program stored in the ROM 207, loads the read program into the RAM 208, and supplies generated commands and the like to the respective units to thereby realize the various operations of the printing system 110.

In the printing system 110, the controller 205 performs control such that print image data generated by the scanner unit 201 and image data of a job input via the external interface 202 or the like is printed using the printer unit 203 and the HDD 209. In doing this, the controller 205 causes image data to be accumulated in the order of pages to be printed and be printed on sheets in the page order, and upon detection of normal discharge of a printed sheet from the apparatus, the controller 205 deletes the image data (page data) associated with the printed sheet from the HDD 209. Then, when the controller 205 detects that all of image data of the job has been printed on sheets, that the printed sheets have been discharged out of the apparatus, and that the image data accumulated in the HDD 209 has been deleted, the controller 205 deletes the job from the HDD 209.

The controller 205 performs the same process when image data or the like is transmitted to an external apparatus, such as the server 103 and the client 104, via the external interface 202. More specifically, when a transmission job for transmitting image data or the like stored in the HDD 209 is started, the controller 205 sequentially deletes transmitted data from the HDD 209, and when all data has been transmitted, the controller 205 deletes the transmission job. Thus, various processes for outputting job data accumulated in the HDD 209 as data to be processed are controlled by the controller 205, and when each outputting process is terminated, data associated with the job to be processed is deleted.

Figure 3:
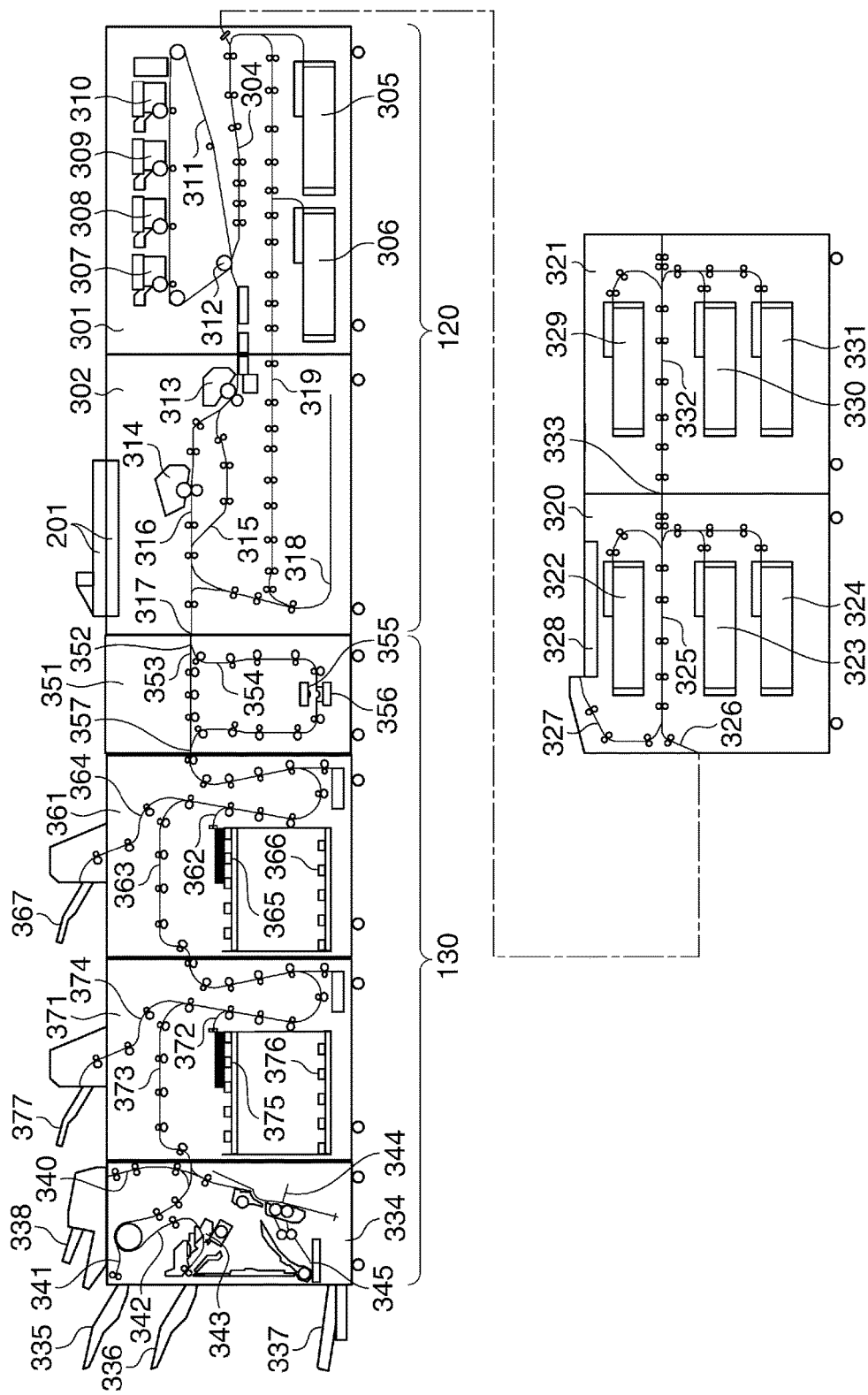
FIG. 3 is a schematic cross-sectional view of a mechanical structure of the printing system appearing in FIG. 1.

Next, a description will be given of the respective mechanical structures of the printing apparatus 120 and the sheet processing apparatus 130, and control of the operation of the sheet processing apparatus 130 by the controller 205, with reference to FIG. 3. FIG. 3 is a cross-sectional view showing the schematic mechanical structure of the printing system 110.

FIG. 3 shows the structure in which two large-capacity sheet feeding decks 320 and 321, which are examples of a sheet feeding accessory device, are connected to the printing apparatus 120 as a component of the printing system 110. Further, although the sheet processing apparatus 130, the printing apparatus 120, and the large-capacity sheet feeding decks 320 and 321 are serially connected in the mentioned order, FIG. 3 illustrates the sheet processing apparatus 130 and the printing apparatus 120 in an upper part of the drawing, and the large-capacity sheet feeding decks 320 and 321 in a lower part of the same. Further, the following description is given of the configuration of the printing system 110 while referring to operations when a copy job is performed, by way of example.

The printing apparatus 120 is roughly formed by an image forming apparatus 301 and an image fixing device 302. The first large-capacity sheet feeding deck 320 is connected to the right side of the image forming apparatus 301, as viewed in FIG. 3. The large-capacity sheet feeding deck 320 is configured to be capable of being further connected to another sheet feeding device, and in this example, the second large-capacity sheet feeding deck 321 is connected to the right side of the large-capacity sheet feeding deck 320, as viewed in FIG. 3. Note that still another large-capacity sheet feeding deck having the same structure can be connected to the second large-capacity sheet feeding deck 321.

The large-capacity sheet feeding decks 320 and 321 make it possible to feed sheets from a sheet feeder other than a standard sheet feeding section (sheet feeding decks 305 and 306), referred to hereinafter, included in the image forming apparatus 301. The operation of the large-capacity sheet feeding decks 320 and 321 is controlled by the controller 205 included in the printing apparatus 120.

Sheet feeding can be selectively performed from sheet feeding decks 322, 323, and 324 of the first large-capacity sheet feeding deck 320 to the image forming apparatus 301, and a sheet taken out of a selected one of the sheet feeding decks 322 to 324 is sent to the image forming apparatus 301 through sheet conveying paths 325 and 326. Sheet feeding can also be selectively performed from sheet feeding decks 329, 330, and 331 of the second large-capacity sheet feeding deck 321 to the image forming apparatus 301. Then, a sheet taken out of a selected one of the sheet feeding decks 329 to 331 is passed into the sheet conveying path 325 through a sheet conveying path 332 and a junction 333. Note that the large-capacity sheet feeding decks 320 and 321 each have a function of detecting multi feed which is sheet conveyance performed in a state where a plurality of sheets are superimposed. When multi feed is detected, the controller 205 changes the sheet conveying path from the normal sheet conveying path 326 to a sheet conveying path 327 to thereby discharge the sheets to an escape tray 328.

The image forming apparatus 301 described as a component of the printing apparatus 120, by way of example, is a 4-D (drum) image forming apparatus having a color printing function. However, the image forming apparatus 301 is not limited to this, but may be one having a monochrome printing function, or a 1-D (drum) image forming apparatus having the color printing function.

The image forming apparatus 301 is provided with the sheet feeding decks 305 and 306 as the standard sheet feeding section. The image forming apparatus 301 includes four stations of Y (yellow), M (magenta), C (cyan), and K (black), and includes developing units 307, 308, 309, and 310 for forming images of the respective colors. Image data generated by the scanner unit 201 is developed into images (toner images) by the image developing units 307 to 310.

The images are transferred onto an intermediate transfer belt 311 as primary transfer, which rotates clockwise as viewed in FIG. 3, and then transferred onto a sheet conveyed from a sheet conveying path 304 at a secondary transfer position 312. The sheet having the image transferred thereon is passed from the image forming apparatus 301 to the image fixing device 302.

In the image fixing device 302, first, a first fixing device 313 applies heat and pressure to the sheet received from the image forming apparatus 301 to thereby fix the image on the sheet. The sheet having passed through the first fixing device 313 is conveyed to a conveying port 317 through a conveying path 315. In a case where additional heating and pressurizing are required to fix the image depending on a type of the sheet, the sheet is conveyed to a second fixing device 314 through an upper conveying path 316 after having passed through the first fixing device 313. The sheet to which heat and pressure have been additionally applied by the second fixing device 314 is conveyed to the conveying port 317. In a case where images are to be formed on both sides of the sheet, the sheet is conveyed to a reversing path 318 and reversed and then is conveyed to a double-sided printing conveying path 319 to be fed to the image forming apparatus 301 again, where image formation is performed on the second side of the sheet at the secondary transfer position 312. After that, the sheet is processed similarly to processing after image formation on the first side.

The sheet processing apparatus 130 is arranged on the left side of the image fixing device 302, as viewed in FIG. 3. The sheet processing apparatus 130 includes a multi-hole puncher 351, the first large-capacity stacker 361, the second large-capacity stacker 371, and the finisher 334. Note that the first large-capacity stacker 361 and the second large-capacity stacker 371 each are a large-capacity sheet stacking apparatus that is capable of stacking a large amount of printed products. In the following description, the "first large-capacity stacker 361" is referred to as the "first stacker 361", and the "second large-capacity stacker 371" is referred to as the "second stacker 371".

The sheet on which image formation is completed in the image fixing device 302 is passed from the conveying port 317 to the multi-hole puncher 351. In a case where execution of multi-hole punching is designated, the sheet is conveyed by a conveying path-changing switch 352 to a sheet conveying path 354 for execution of multi-hole punching. Then, the sheet is sandwiched between a protruding multi-hole punching die 355 and a recessed multi-hole punch receiving die 356, whereby punch holes are formed, and then the sheet is conveyed into a normal conveying path 353 via a sheet confluence point 357. As a consequence, the sheet on which punching has been performed is conveyed to the first stacker 361 disposed downstream of the multi-hole puncher 351, similarly to a sheet which is not subjected to punching.

The combination of the multi-hole punching die 355 and the multi-hole punch receiving die 356 is replaceable, and an operator can set a combination of dies for an appropriate number of holes each having an appropriate hole shape, as desired. On the other hand, when execution of multi-hole punching is not designated, a sheet is conveyed to the conveying path 353 by the conveying path-changing switch 352, further conveyed to the sheet confluence point 357, and then conveyed to the first stacker 361 disposed downstream of the multi-hole puncher 351.

The first stacker 361 includes the stacking section 365 which is capable of stacking a large amount of sheets, and the escape tray 367. The first stacker 361 conveys sheets received from the multi-hole puncher 351 to one of a stacking conveying path 362, a through conveying path 363, and an escape conveying path 364. When an instruction for stacking the sheets on the stacking section 365 has been given, each sheet is conveyed into the stacking conveying path 362, and is discharged onto the stacking section 365. When an instruction for stacking the sheets on the escape tray 367 has been given, each sheet is conveyed into the escape conveying path 364, and is discharged onto the escape tray 367. When an instruction for stacking the sheets on a sheet discharge destination disposed downstream of the first stacker 361 (in the present embodiment, the second stacker 371), each sheet is conveyed into the through conveying path 363, and is conveyed to the sheet discharge destination disposed downstream of the first stacker 361 (the second stacker 371). The stacking section 365 and the escape tray 367 are each provided with a sensor for detecting a stacked state (an approximate stacked amount, occurrence of a tray-full state (fully-stacked state), and the like) of printed products, and data indicative of detection by the sensor is constantly transmitted to the controller 205.

Figure 4:
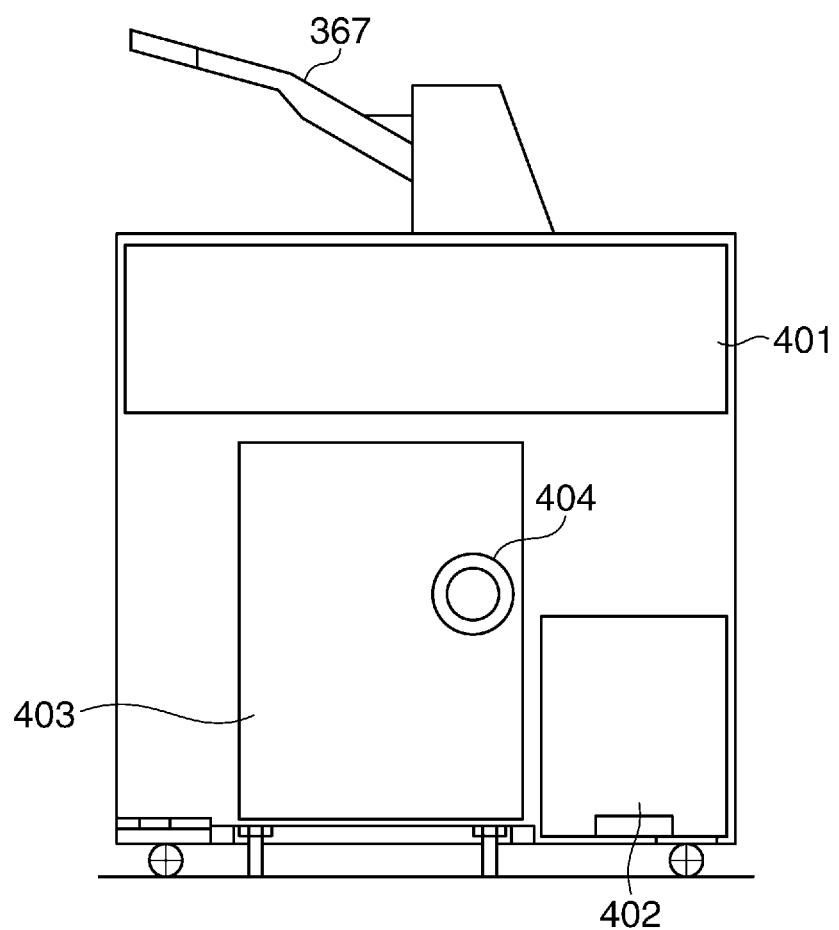
FIG. 4 is a front view of a first large-capacity stacker which is one of sheet processing apparatuses as components of the printing system appearing in FIG. 1.

FIG. 4 is a front view of the first stacker 361. The first stacker 361 includes a conveying path upper cover 401, a conveying path right cover 402, a front cover 403, and an open button 404. The front cover 403 can be opened by an open instruction from the controller 205 issued in response to pressing of the open button 404, detection of the tray-full state, or the like.

When the first stacker 361 receives an instruction for opening the front cover 403 from the controller 205, it slides the front cover 403 upward, and opens the front cover 403. At this time, within the first stacker 361, the stacking section 365 is lowered, and printed products stacked on the stacking section 365 are transferred onto the eject tray 366 appearing in FIG. 3, which is a take-out section for taking out printed products.

When the printed products have been transferred onto the eject tray 366, the eject tray 366 is caused to be ejected out of the first stacker 361, whereby the operator is enabled to take out the printed products. At the same time, the stacking section 365 is lifted again and is returned to a position at which sheets can be stacked. When the first stacker 361 is thus enabled to stack sheets conveyed thereto again, the first stacker 361 notifies the controller 205 that the first stacker 361 has returned to the stacking enabled state.

The first stacker 361 is configured to, upon detection of removal of the stacked printed products from the eject tray 366, automatically retract the eject tray 366 into the apparatus again, and slide and close the front cover 403. This makes it possible to continuously discharge sheets to the stacking section 365 while printed products are being removed from the eject tray 366, whereby it is possible to construct the printing system 110 having higher productivity. In the following description, a state of the eject tray 366 protruded out of the apparatus with printed products stacked thereon is referred to as the eject state, and causing the eject tray 366 to be protruded out of the apparatus is referred to as eject processing.

In the present embodiment, the second stacker 371 is connected to the downstream of the first stacker 361 so as to make it possible to further continuously output sheets. The second stacker 371 includes a stacking conveying path 372, a through conveying path 373, an escape conveying path 374, the stacking section 375, the eject tray 376, and the escape tray 377, similarly to the first stacker 361.

The first stacker 361 and the second stacker 371 are connected in tandem, and the operation of the second stacker 371 is the same as that of the first stacker 361. This makes it possible to continuously output sheets and take out printed products for a longer time period. For example, when the first stacker 361 is in the eject state, and the stacking section 365 of the first stacker 361 becomes full, the target of the sheet stacking instruction from the controller 205 is changed to the second stacker 371. This enables the printing apparatus 120 to continuously output a large amount of sheets to the second stacker 371.

Sheets conveyed through the second stacker 371 are conveyed to the finisher 334. The finisher 334 performs predetermined finishing processing on the sheets conveyed thereto according to a function designated by the operator. For example, the finisher 334 has functions of stapling (one-point/two-point binding), punching (two-hole/three-hole punching), saddle-stitch bookbinding, and so forth.

The finisher 334 includes the two discharge trays 335 and 336. Sheets are output to the discharge tray 335 through a sheet conveying path 341, and in this case, the sheets are not subjected to finishing processing, such as stapling and punching. On the other hand, in a case where finishing processing, such as stapling or punching, is performed, sheets are conveyed to a sheet processing section 343 through a sheet conveying path 342, and are discharged onto the discharge tray 336 after being subjected to designated finishing processing by the sheet processing section 343. Note that the discharge trays 335 and 336 can be lifted and lowered, and by lowering the discharge tray 335, the discharge tray 335 can be operated to also stack thereon sheets subjected to finishing processing by the sheet processing section 343. Printed products which are the sheets stacked on the discharge trays 335 and 336 are taken out by the operator. The discharge trays 335 and 336 are each provided with a sensor for detecting the stacked state of printed products, and data indicative of detection by the sensor is constantly transmitted to the controller 205.

The finisher 334 includes an inserter 338, and is configured to be capable of inserting, when sheet insertion is designated by the operator, an insertion sheet which is set on the inserter 338 between predetermined pages through a sheet conveying path 340. Further, when saddle-stitch bookbinding is designated, after the center of sheets is stapled by a saddle-stitch processing section 344, the sheets are folded into two, and are discharged onto the saddle-stitch bookbinding tray 337 through a sheet conveying path 345. The saddle-stitch bookbinding tray 337 is formed as a belt conveyer, and the sheet bundle which has been subjected to saddle-stitch bookbinding and stacked on the saddle-stitch bookbinding tray 337 can be conveyed to the left, as viewed in FIG. 3, whenever each sheet bundle is stacked.

As described above, in the printing system 110, the processing operations of sheet feeding, printing, sheet processing, sheet discharging, and so forth, are performed.

Figure 5:
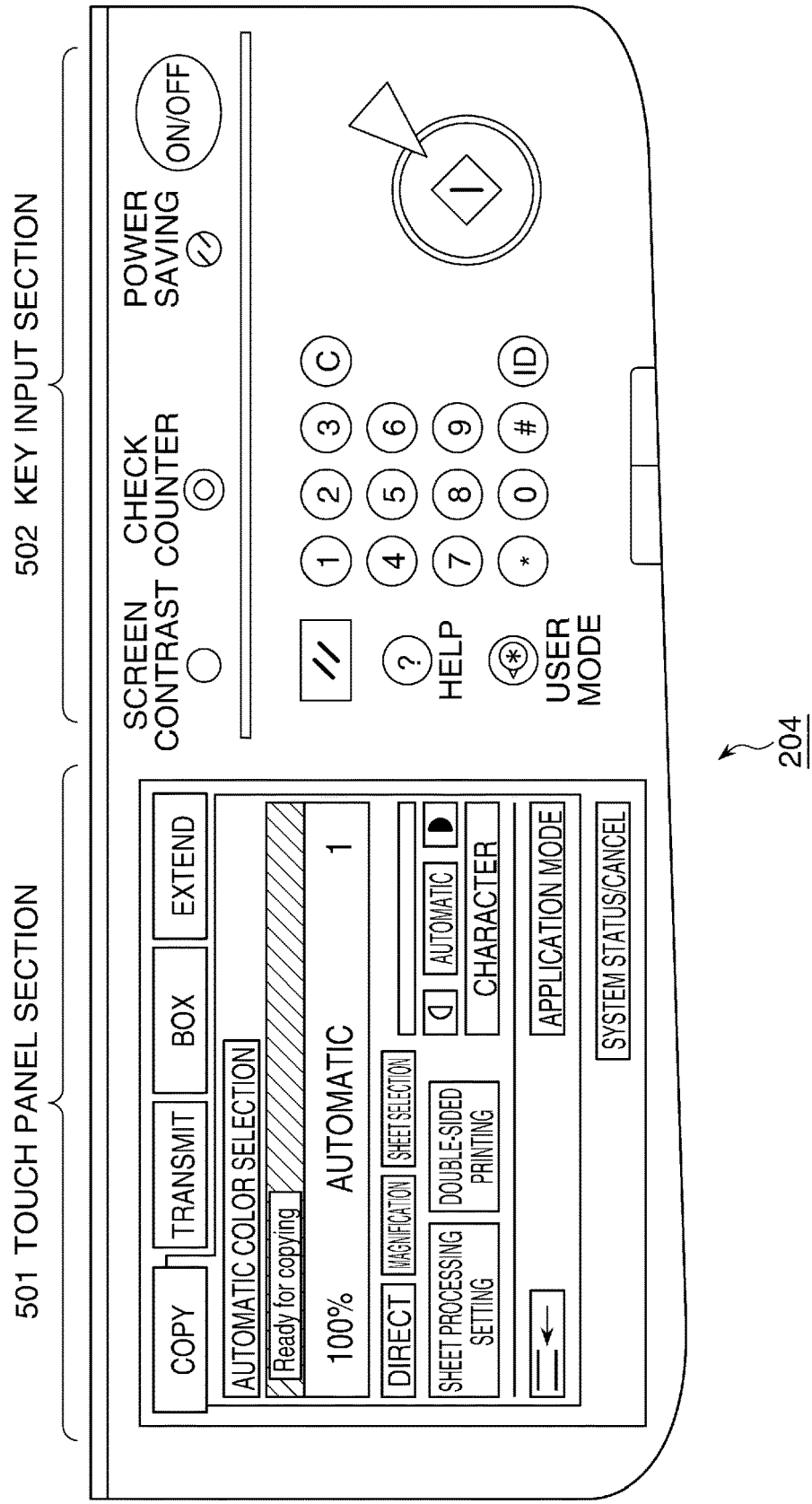
FIG. 5 is a view of a user interface of a console section included in a printing apparatus as a component of the printing system appearing in FIG. 1.

Next, a description will be given of the console section 204 included in the printing apparatus 120 as a user interface (UI) of the printing system 110. FIG. 5 is a view of the console section 204. The console section 204 is roughly formed by a touch panel section 501 that displays a GUI screen for receiving an operation input from the operator using one of soft keys (display keys), and a key input section 502 that receives an operation input from the operator using one of hard keys.

The operator can make operation settings and input a job in the printing system 110 by input operations via the touch panel section 501 and the key input section 502. Upon receipt of a command for performing a job via the console section 204, the controller 205 controls the overall operation of the printing system 110 to thereby perform the job.

Further, the touch panel section 501 can display various information, such as information indicative of an operating state of the printing system 110 and information to be notified to the operator. For example, the touch panel section 501 also displays e.g. a warning (see FIG. 15) generated when a tray-full state occurs in the first and second stackers 361 and 371, as will be described thereafter.

Here, it is assumed that the server 103 or the client 104 that generates a job to be performed by the printing system 110 can generate a job having a setting for automatically changing the sheet discharge destination setting between the stacking sections 365 and 375 of the first and second stackers 361 and 371. In the following description, the server 103 and the client 104 each include a job generation UI section, and can generate a job to be performed by the printing system 110 via the job generation UI section. Further, a controller which is comprised of a CPU and is included in each of the server 103 and the client 104 performs display control.

FIG. 6 is a printer driver-setting screen (GUI) provided in each of the server 103 and the client 104, for generating a job. When a command for executing printing is selected on software operating on each of the server 103 and the client 104, the job generation UI section displays the printer driver-setting screen shown in FIG. 6 on a display device, not shown, included in each of the server 103 and the client 104.

Figure 7:
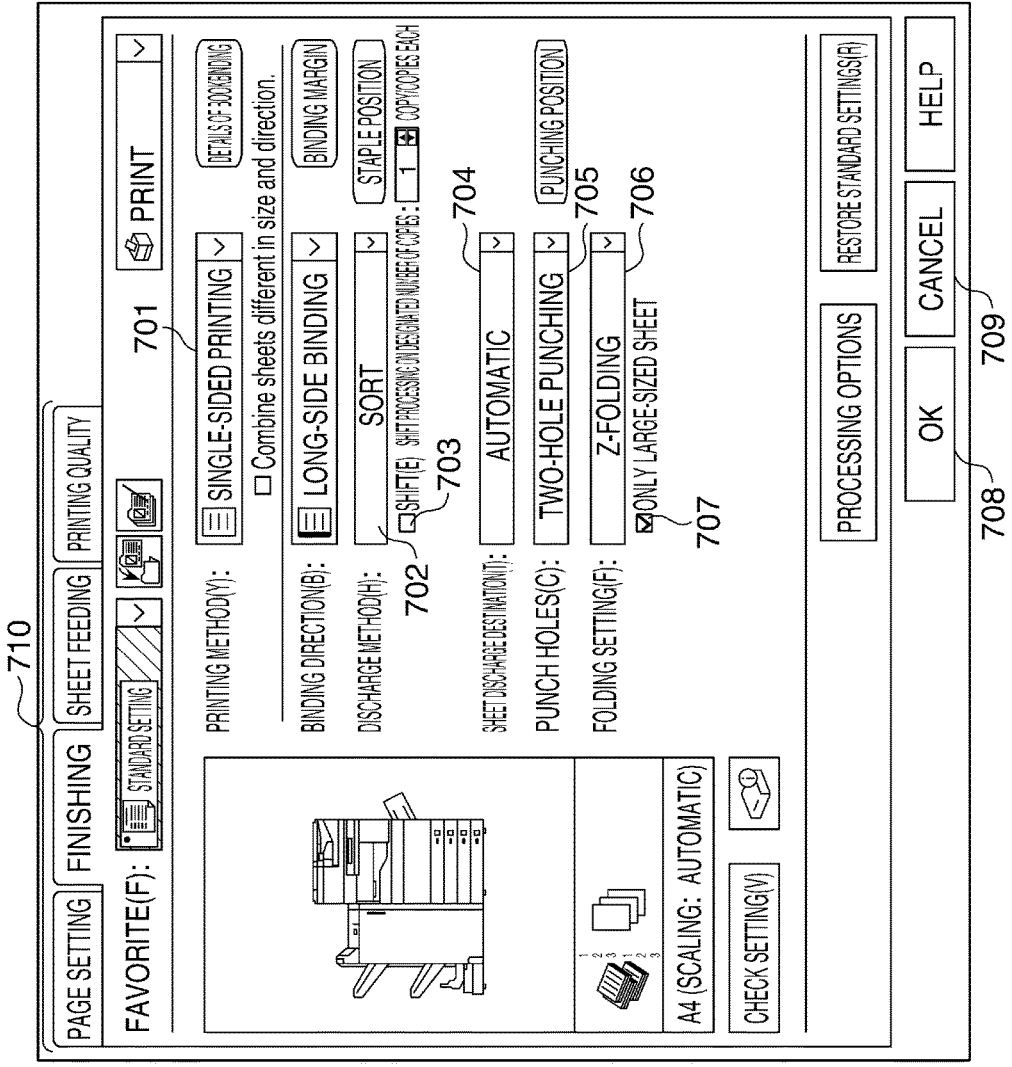
FIG. 7 is a view of an example of a GUI (graphical user interface) displayed when a property button is selected on the setting screen shown in FIG. 6.

When a property button 601 is selected and pressed e.g. by clicking using a mouse on the setting screen shown in FIG. 6, the job generation UI section displays a GUI screen shown in FIG. 7. Further, when an OK button 602 is pressed on the setting screen shown in FIG. 6, the job generation UI section generates the received setting as job data, and transmits the generated job data to the selected printing system (here, the printing system 110).

FIG. 7 is a view of an example of the GUI screen which is displayed on the display device of each of the server 103 and the client 104 when the property button 601 is selected on the setting screen shown in FIG. 6. The GUI screen is displayed by the job generation UI section as a screen (print setting reception screen) for receiving a finishing setting. On the GUI screen shown in FIG. 7, a pull-down 701 for selecting a printing method enables selection between single-sided printing and double-sided printing of the whole job. Further, a pull-down 702 for selecting a sheet discharging method enables selection of any of group sorting, staple sorting, and others, as the sheet discharging method. A shift application check box 703 enables selection of shift processing.

Figure 8:
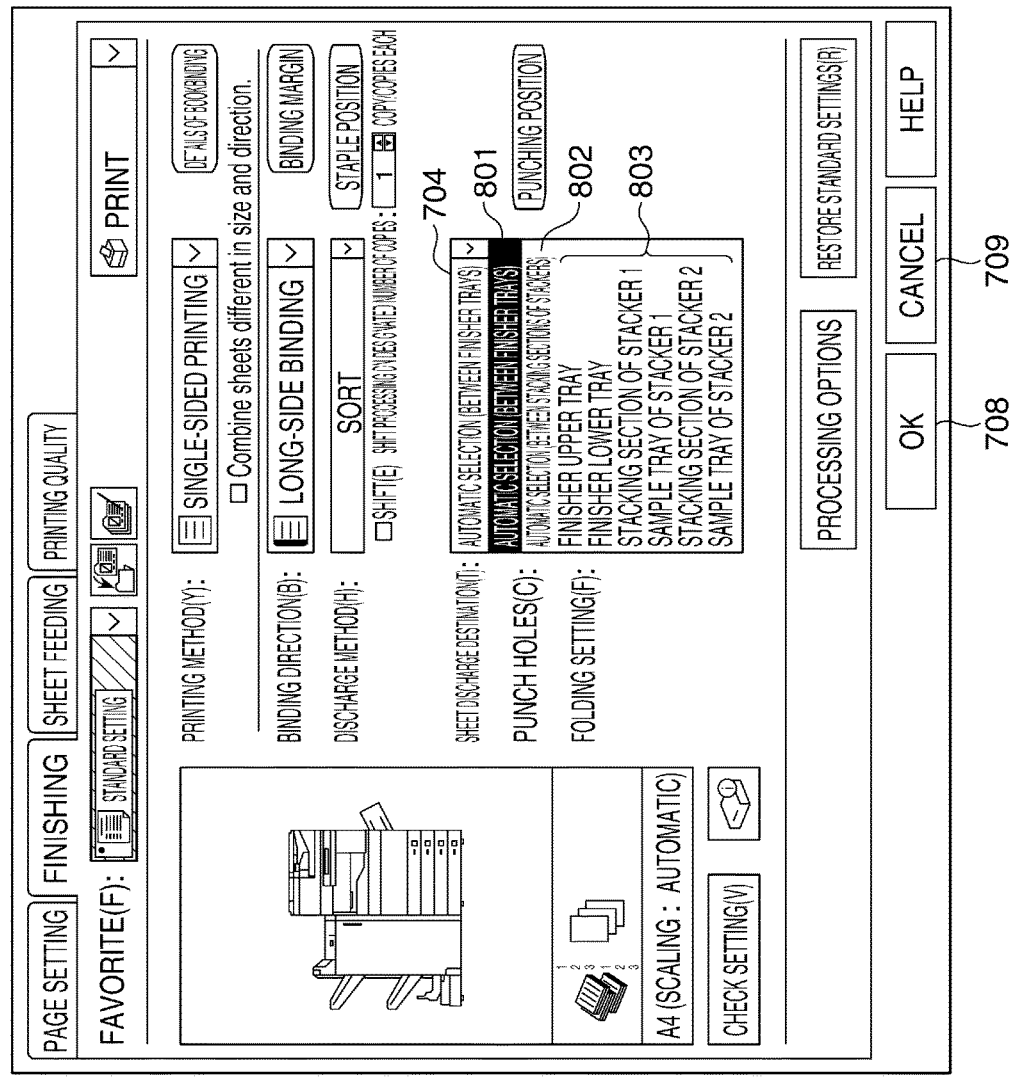
FIG. 8 is a view of an example of a list of selectable sheet discharge destinations displayed by pressing a sheet discharge destination selection pull-down button appearing in FIG. 7.

A sheet discharge destination selection pull-down 704 enables selection between selecting a specified tray as a sheet discharge destination and automatically switching the sheet discharge destination by the printing system 110. FIG. 8 is a view of an example of a list of sheet discharge destinations which is displayed for selection, when the sheet discharge destination selection pull-down 704 is pressed. On the sheet discharge destination list, a currently selected sheet discharge destination is highlighted, and FIG. 8 shows a state in which an automatic selection setting 801 for selecting between the discharge trays 335 and 336 of the finisher 334 is selected. In the present embodiment, the sheet discharge destination list displays not only the automatic selection setting 801 for selection in the finisher 334, but also a stacker automatic selection setting 802 and a fixed setting 803, for selection. When the stacker automatic selection setting 802 is selected, the sheet discharge destination is automatically selected between the respective stacking sections 365 and 375 of the first and second stackers 361 and 371. When one of a plurality of options of the fixed setting 803 is selected, the selected sheet discharge destination is set as the fixed sheet discharge destination.

By displaying this sheet discharge destination list, the user (operator of the server 103 and the client 104) can flexibly set the sheet discharge destination according to various situations. For example, when the user desires to automatically determine the sheet discharge destination according to the finishing setting, it is possible to satisfy the user's requirement by selecting the automatic selection setting 801 in the finisher 334. On the other hand, when the user desires to separate his/her own job from a job of another user by using a fixed sheet discharge destination, it is possible to satisfy the user's requirement by selecting a desired sheet discharge destination from the options of the fixed setting 803. Further, when the user desires to continuously perform printing as long as possible, it is possible to satisfy the user's requirement by selecting the stacker automatic selection setting 802. Note that when the automatic selection setting 801 or the stacker automatic selection setting 802 is selected as the sheet discharge destination setting, the user may be enabled to select the order of priority of settings of the sheet discharge destination.

Referring again to FIG. 7, a punch hole selection pull-down 705 enables the user to select a type of punch holes, and a folding setting selection pull-down 706 enables the user to select a type of folding. When Z-folding is selected as the folding setting, the job generation UI section enables a Z-folding application condition check box 707 to thereby allow the user to select whether or not to execute Z-folding only on large-sized sheets. When an OK button 708 appearing in FIG. 7 is pressed, the settings received so far are stored by the job generation UI section as the settings of the job, whereas when a cancel button 709 is pressed, the settings received so far are canceled, and the previous settings are saved. Further, the GUI screen shown in FIG. 7 displays a tab 710 for changing between types of job setting reception. The tab 710 is used for changing the display between not only a screen for receiving the finishing setting, but also a screen for receiving settings concerning the sheet feeding method, and a screen for receiving settings concerning the quality of a printed image.

Figure 9:
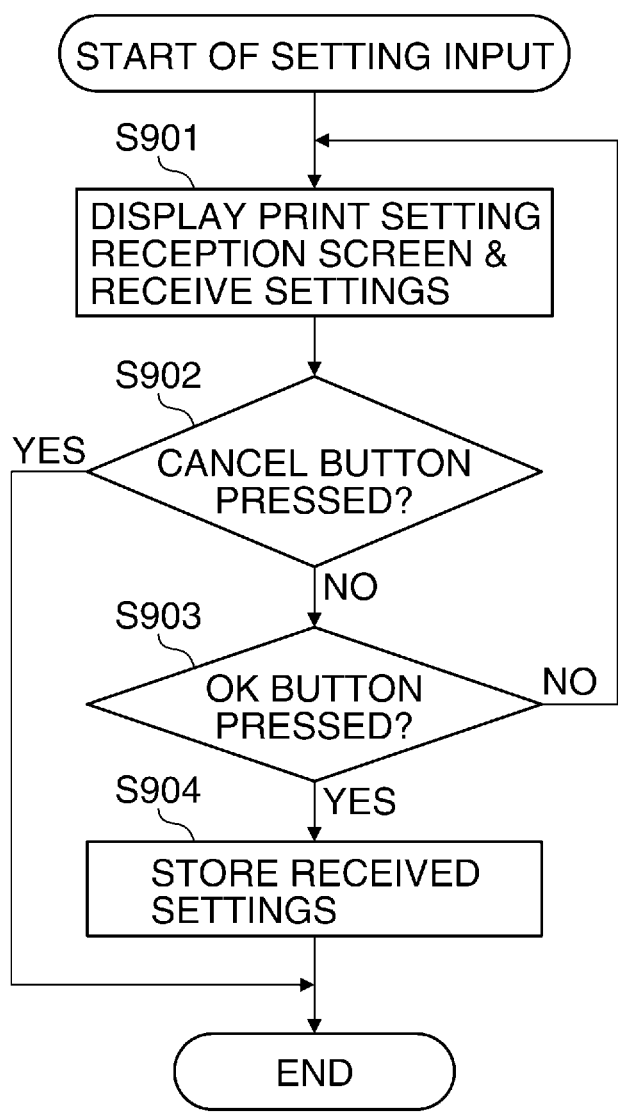
FIG. 9 is a flowchart of a setting reception process for receiving a job, which is performed by a job generation UI section included in the server or the client as a component of the printing system appearing in FIG. 1.

FIG. 9 is a flowchart of a setting reception process performed when the job generation UI section receives a job. The setting reception process in FIG. 9 is started when the property button 601 is pressed on the printer driver-setting screen shown in FIG. 6, and the GUI screen (print setting reception screen) shown in FIG. 7 is displayed. Further, steps of the process in FIG. 9 are performed by the job generation UI section provided in each of the server 103 and the client 104.

In the a step S901, the job generation UI section displays the GUI screen (print setting reception screen), shown in FIG. 7, for receiving job settings, and receives the job settings input by the operation of the various buttons and the pull-downs on the GUI screen. In a step S902, the job generation UI section determines whether or not the cancel button 709 has been pressed. If the cancel button 709 has been pressed (YES to the step S902), the job generation UI section cancels the settings received in the step S901, causes the present process to be terminated, and returns the display to the printer driver-setting screen shown in FIG. 6. If the cancel button 709 has not been pressed (NO to the step S902), the job generation UI section proceeds to a step S903.

In the step S903, the job generation UI section determines whether or not the OK button 708 has been pressed. If the OK button 708 has been pressed (YES to the step S903), the job generation UI section proceeds to a step S904, whereas if the OK button 708 has not been pressed (NO to the step S903), the job generation UI section returns to the step S901. In the step S904, the job generation UI section stores the settings received in the step S901, causes the present process to be terminated, and returns the display to the printer driver-setting screen shown in FIG. 6.

Note that the method of generating a job in the server 103 or the client 104 is not limited to the method used in the setting reception process in FIG. 9, which is performed by the job generation UI section. For example, a job may be generated by another application, or may be generated by receiving job settings via the console section 204 of the printing apparatus 120.

Next, a description will be given of the control performed in the printing system 110 when the printing system 110 receives job data created by an external apparatus (more specifically, the server 103 or the client 104). The following control of the printing system 110 is performed by the controller 205 loading a predetermined program stored in the ROM 207 into the RAM 208 and controlling the operation of the units of the printing system 110. In the following description, in a case where the first and second stackers 361 and 371 are not specifically distinguished, the first and second stackers 361 and 371 are simply referred to as the stacker, and similarly, the stacking sections 365 and 375, and the eject trays 366 and 376 are simply referred to as the stacking section and the eject tray.

Figure 10:
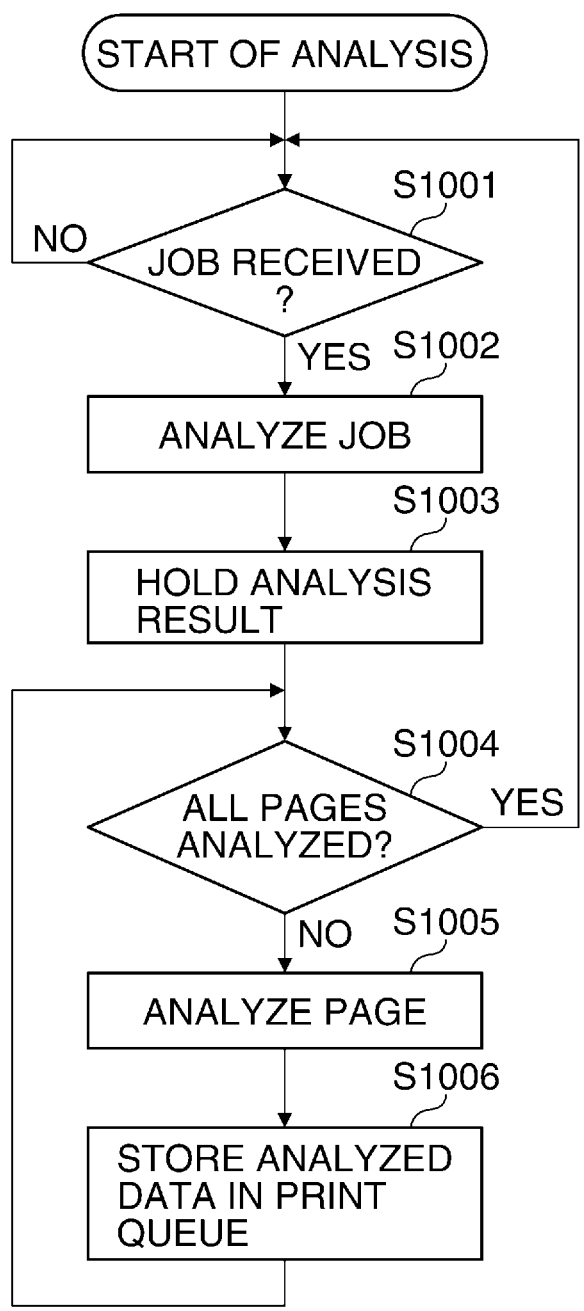
FIG. 10 is a flowchart of a job analysis process for analyzing job data, which is performed in the printing system appearing in FIG. 1.

FIG. 10 is a flowchart of a job analysis process for analyzing job data, which is performed in the printing system 110. In a step S1001, the controller 205 determines whether or not a job has been received from an external apparatus, and if no job has been received (NO to the step S1001), the controller 205 repeats the determination in the step S1001, and is on standby until a job is received. If a job has been received (YES to the step S1001), the controller 205 analyzes job data of the received job in a step S1002. Then, in a step S1003, the controller 205 temporarily stores the result of analysis, obtained in the step S1002, in the RAM 208.

After that, in a step S1004, the controller 205 determines whether or not all of the page data included in the job data has been analyzed. If all of the page data has been analyzed (YES to the step S1004), the controller 205 returns to the step S1001, whereas if there is unanalyzed page data (NO to the step S1004), the controller 205 proceeds to a step S1005. In the step S1005, the controller 205 analyzes a top page of the unanalyzed pages. In a step S1006, the controller 205 stores the page data analyzed in the step S1005 and the analysis result temporarily stored in the step S1003 together in a print queue in the HDD 209 as the print settings of the job. Then, the controller 205 returns to the step S1004.

Figure 11:
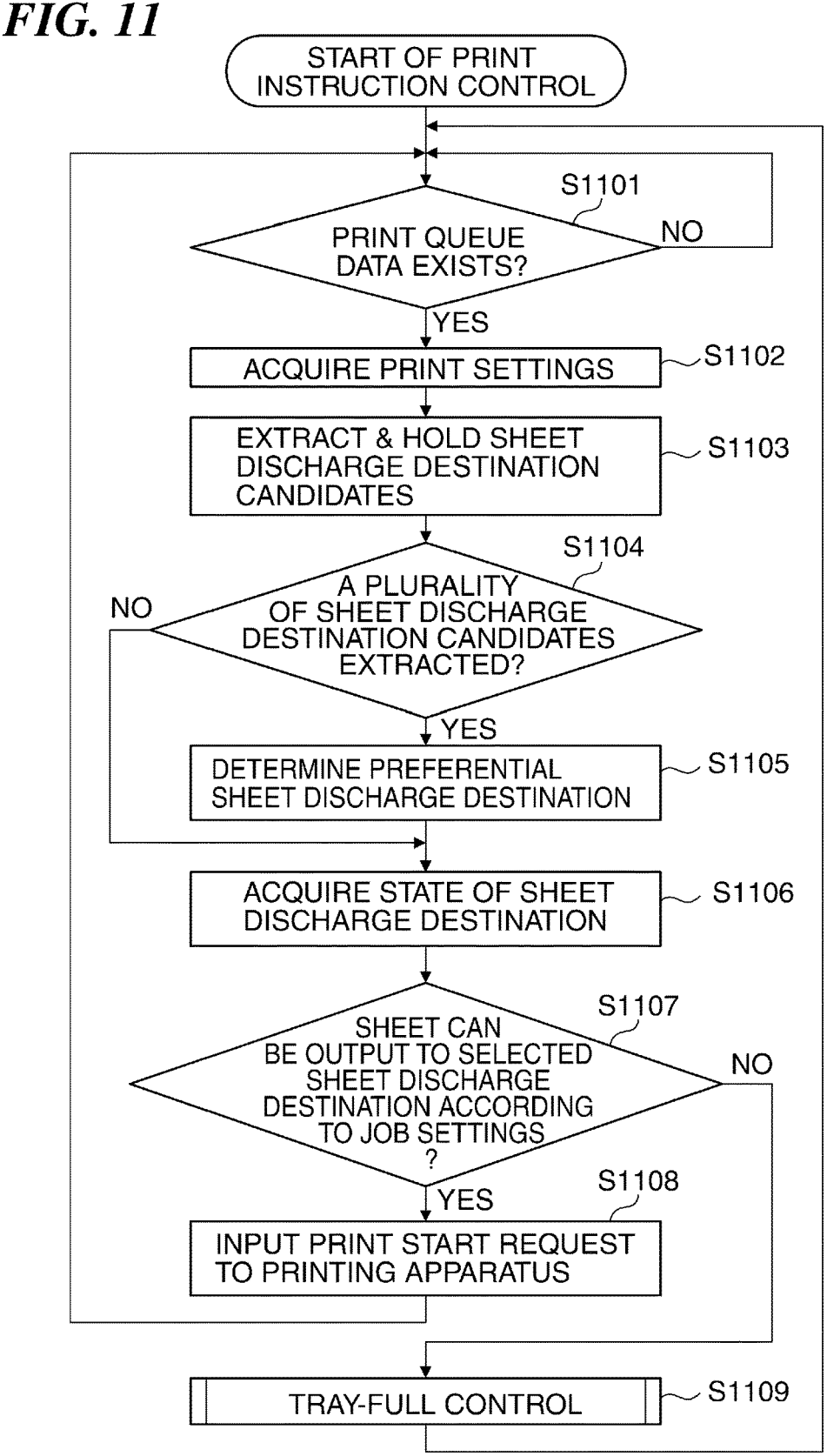
FIG. 11 is a flowchart of a print instruction control process for an analyzed job, which is performed in the printing system appearing in FIG. 1.

FIG. 11 is a flowchart of a process for controlling printing of an analyzed job. In a step S1101, the controller 205 determines whether or not there is print queue data (page data analyzed and awaiting printing, which was stored in the print queue in the HDD 209 in the step S1006). If there is no job in the print queue (NO to the step S1101), the controller 205 repeats the determination in the step S1101, and is on standby until a job is stored in the print queue. If there is print queue data in the print queue (YES to the step S1101), the controller 205 proceeds to a step S1102.

In the step S1102, the controller 205 acquires the print settings of the print queue data. In the following step S1103, the controller 205 reads the sheet discharge destination setting from the print settings acquired in the step S1102, extracts all candidates of the sheet discharge destination to which a sheet can be discharged, and temporarily stores the extracted candidates in the RAM 207. Then, in a step S1104, the controller 205 determines whether or not a plurality of sheet discharge destination candidates have been extracted in the step S1103. If the plurality of sheet discharge destination candidates have been extracted (YES to the step S1104), the controller 205 proceeds to a step S1105, whereas if one sheet discharge destination candidate has been extracted (NO to the step S1104), the controller 205 proceeds to a step S1106.

In the step S1105, the controller 205 determines a sheet discharge destination to be preferentially set, out of the plurality of sheet discharge destination candidates. Although in this example, the printing apparatus 120 fixedly holds the order of priority of settings of the sheet discharge destination, this is not limitative, but the user may be allowed to select a sheet discharge destination as a setting of the printing apparatus 120, or may be allowed to set the same on a job-by-job basis. In the following step S1106, the controller 205 acquires a state of the determined sheet discharge destination (selected one of the discharge trays 335 and 336 of the finisher 334, the stacking section of the stacker, and so forth).

In a step S1107, the controller 205 determines based on the state of the sheet discharge destination, acquired in the step S1106, and the print settings of a page to be output, whether or not a sheet on which the corresponding page has been printed can be output to the sheet discharge destination determined in the step S1105. If the printed sheet can be output (YES to the step S1107), the controller 205 proceeds to a step S1108, whereas if the printed sheet cannot be output (NO to the step S1107), the controller 205 proceeds to a step S1109. Note that in the output possibility determination in the step S1107, even when sheets have already been stacked on the sheet discharge destination, if the sheet discharge destination can stack more sheets, it is determined that the sheet can be output. However, this is not limitative, but even in a case where the sheet discharge destination can stack more sheets, if an output product of a different job is going to be mixed therein, it may be determined that the sheet cannot be output thereto.

In the step S1108, the controller 205 outputs a print start request to the printing apparatus 120 for outputting the printed sheet to the selected sheet discharge destination. On the other hand, in the step S1109, the controller 205 performs tray-full control. The controller 205 returns to the step S1101 after execution of either the step S1108 or the step S1109. The tray-full control performed in the step S1109 will be described in detail hereinafter with reference to FIGS. 13A and 13B.

Figure 12:
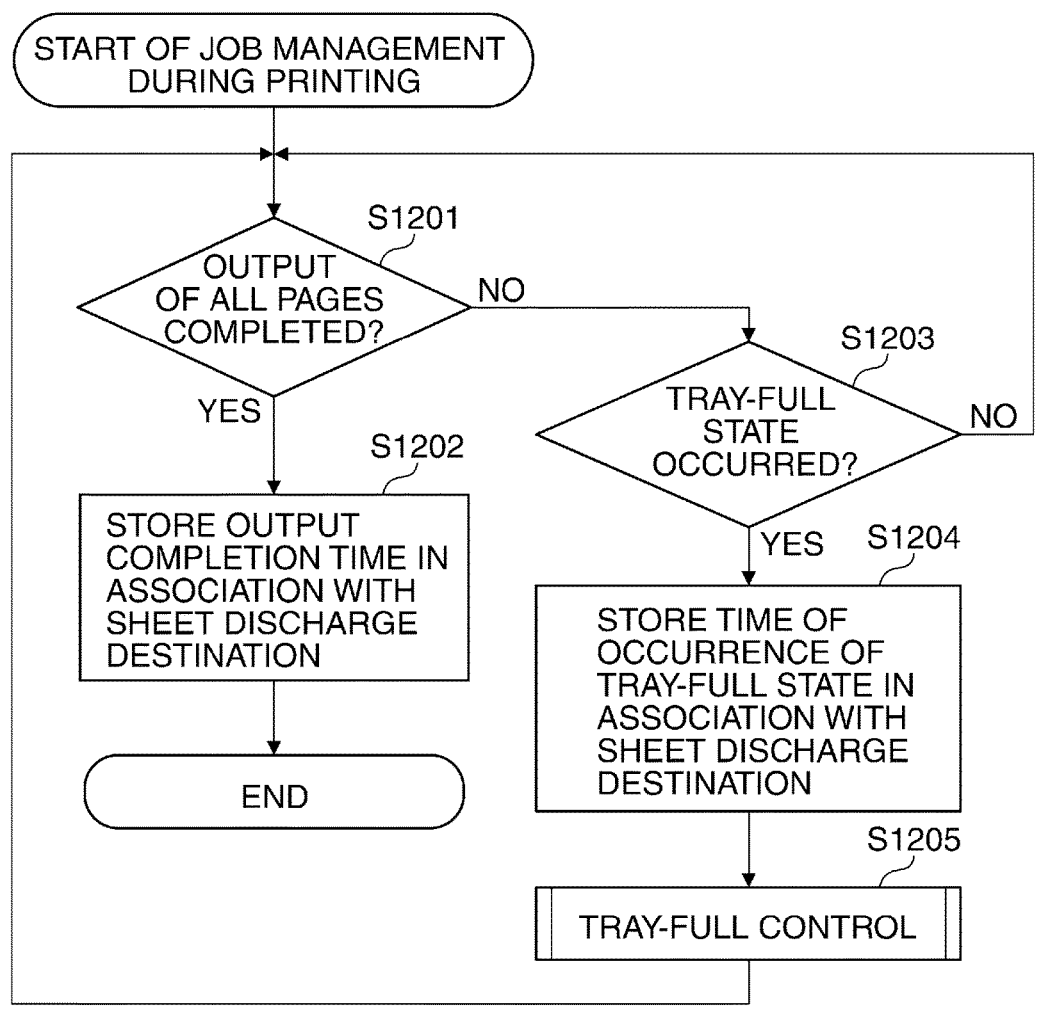
FIG. 12 is a flowchart of a job management control process performed in the printing system appearing in FIG. 1.

When at least one page is processed according to the print start request in the step S1108, the controller 205 performs a job management control process on a job-by-job basis. FIG. 12 is a flowchart of the job management control process performed in the printing system 110.

In a step S1201, the controller 205 determines whether or not all of the pages in the job have been printed on sheets and the printed sheets have been output. If all printed sheets have been output (YES to the step S1201), the controller 205 proceeds to a step S1202, whereas if all printed sheets have not been output (NO to the step S1201), the controller 205 proceeds to a step S1203. In the step S1202, the controller 205 stores the time of output completion in the HDD 209 in a manner associated with the sheet discharge destination, followed by terminating the present process.

On the other hand, in the step S1203, the controller 205 determines whether or not there is a factor hindering output processing. Here, as an example of the factor hindering output processing, the controller 205 determines whether or not the tray-full state has occurred in the sheet discharge destination. If the tray-full state has not occurred (NO to the step S1203), the controller 205 returns to the step S1201, whereas if the tray-full state has occurred (YES to the step S1203), the controller 205 proceeds to a step S1204. In the step S1204, the controller 205 stores the time at which the tray-full state has occurred (i.e. the time at which it is detected that the set sheet discharge destination has become unable to stack a discharged sheet) in the HDD 209 in a manner associated with the sheet discharge destination which has become full. Then, in a step S1205, the controller 205 performs the tray-full control process, and then returns to the step S1201.

Although here, the tray-full state is taken as an example of the factor hindering output processing, this is not limitative, but if another hindering factor is generated, storage and control processes corresponding to the step S1204 and S1205 are performed according to the other hindering factor. For example, in a case where output is interrupted e.g. due to a condition where there is no sheet to be printed (sheet out) or a condition where the door of the printing apparatus 120 is opened (door open), by improving this condition, the process returns to the step S1201.

Figure 13A:
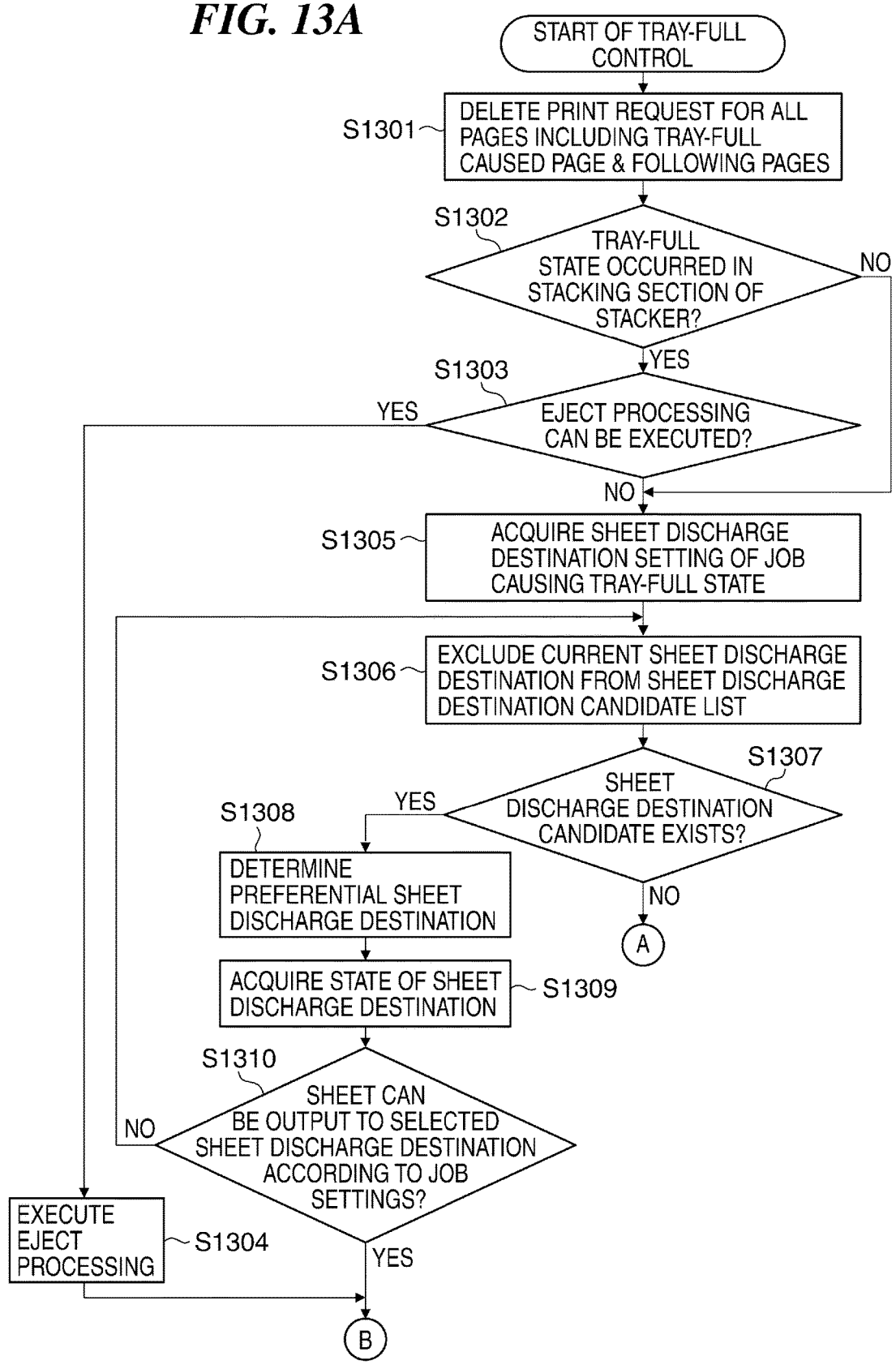
FIG. 13A is a flowchart of a tray-full control process performed in the print instruction control process in FIG. 11 and the job management control process in FIG. 12.

FIGS. 13A and 13B are a flowchart of the tray-full control performed in the step S1109 and the step S1205. In a step S1301, the controller 205 deletes all page data of the print request, corresponding to a page which is the factor of occurrence of the tray-full state and the subsequent pages, and temporarily stops the print request. In the following step S1302, the controller 205 determines whether or not the sheet discharge destination which has become full is the stacking section of the stacker. If the stacking section has become full (YES to the step S1302), the controller 205 proceeds to a step S1303, whereas if the stacking section has not become full (NO to the step S1302), the controller 205 proceeds to a step S1305. Note that in the step S1302, the controller 205 determines whether or not at least one of the stacker sections 365 and 375 of the first and second stackers 361 and 371 has become full. However, the sheet discharge destination on which the tray-full determination is to be performed is not limited to the stacking sections 365 and 375, but the tray-full determination may be performed on any other tray insofar as it is a tray onto which sheets can be continuously discharged by performing some processing e.g. for taking out printed products.

In the step S1303, the controller 205 checks the state of the eject tray of the stacker including the stacking section which has become full, and determines whether or not eject processing can be performed. If eject processing can be performed (YES to the step S1303), the controller 205 proceeds to a step S1304, whereas if eject processing cannot be performed (NO to the step S1303), the controller 205 proceeds to the step S1305.

In the step S1304, the controller 205 causes the stacker including the stacking section which has become full to perform eject processing, and then proceeds to a step S1316 in FIG. 13B. On the other hand, in the step S1305, the controller 205 acquires the sheet discharge destination setting of the interrupted job, and stores the acquired setting in the RAM 208 together with the sheet discharge destination candidate list. In the following step S1306, the controller 205 excludes the sheet discharge destination which is full at present (the stacking section of the stacker) from the sheet discharge destination candidate list to thereby update the sheet discharge destination candidate list stored in the RAM 208. Then, in a step S1307, the controller 205 determines whether or not the updated sheet discharge destination candidate list includes any other sheet discharge destination candidate. If the updated sheet discharge destination candidate list includes any other sheet discharge destination candidate (YES to the step S1307), the controller 205 proceeds to a step S1308, whereas if there is no other sheet discharge destination candidate (NO to the step S1307), the controller 205 proceeds to a step S1311 in FIG. 13B.

In the step S1308, the controller 205 selects a sheet discharge destination candidate to be preferentially set from the updated sheet discharge destination candidate list. In a step S1309, the controller 205 acquires the state of the selected sheet discharge destination. In a step S1310, the controller 205 determines based on the acquired state of the sheet discharge destination and the job settings whether or not a printed sheet can be output to the selected sheet discharge destination. If a printed sheet can be output to the selected sheet discharge destination (YES to the step S1310), the controller 205 proceeds to the step S1316 in FIG. 13B, whereas if a printed sheet cannot be output to the selected sheet discharge destination (NO to the step S1310), the controller 205 returns to the step S1306 to search for another sheet discharge destination.

Figure 15A:
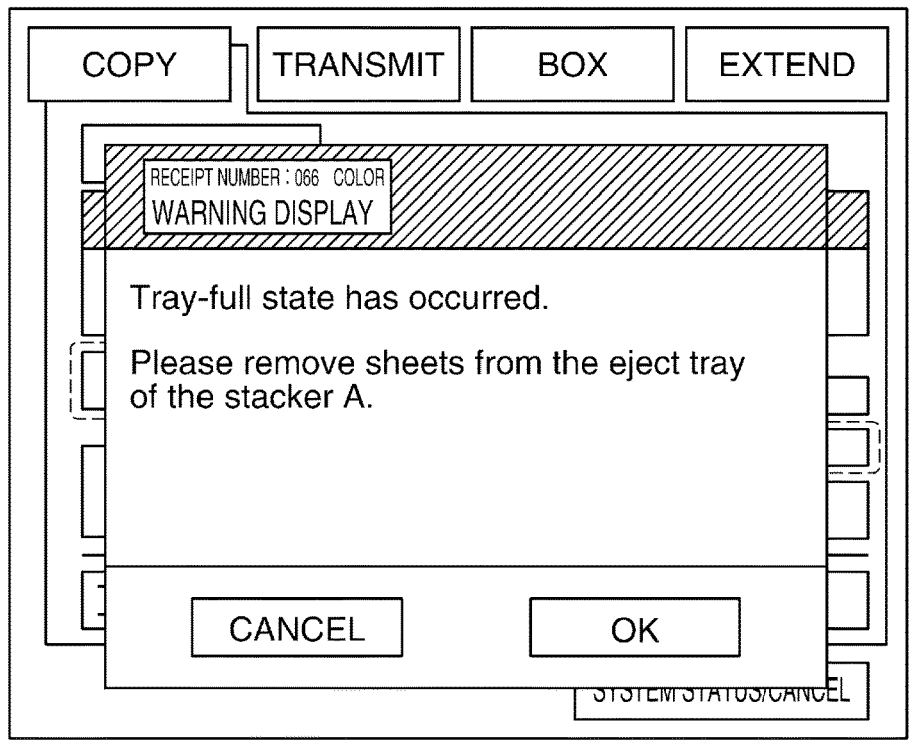
FIG. 15A is a view of an example of a warning display displayed on a touch panel section of the printing apparatus in a step in FIG. 13B of the tray-full control process.

Referring to FIG. 13B, in the step S1311, the controller 205 determines whether or not the sheet discharge destination setting acquired in the step S1305 is set to a fixed sheet discharge destination. If the sheet discharge destination setting is set to a fixed sheet discharge destination (YES to the step S1311), the controller 205 proceeds to a step S1312, whereas if the sheet discharge destination setting is not set to a fixed sheet discharge destination (NO to the step S1311), the controller 205 proceeds to a step S1317. In the step S1312, the controller 205 judges that it is necessary to output a printed sheet to the sheet discharge destination according to the fixed sheet discharge destination setting, and displays a warning on the touch panel section 501 of the printing apparatus 120. FIG. 15A is a view of an example of the warning display displayed on the touch panel section 501 by the processing of the step S1312. This warning display prompts the operator of the printing system 110 to perform an operation for removing the printed product from the sheet discharge destination. The "stacker A" in FIG. 15A indicates the first stacker 361, for example.

In a case where the process proceeds from the step S1311 to the step S1317, since the sheet discharge destination setting is set to automatic selection within the printing apparatus 120, the controller 205 determines whether or not the sheet discharge destination setting is set to automatic selection between the stackers. If the sheet discharge destination setting is set to automatic selection between the stackers (YES to the step S1317), the controller 205 proceeds to a step S1318, whereas if the sheet discharge destination setting is set to automatic selection of a sheet discharge destination other than the stackers (NO to the step S1317), the controller 205 proceeds to the step S1312. In the present embodiment, when automatic selection between the stackers is selected, it is judged that these stackers are used in a situation in which a job can be managed in a manner across a plurality of stackers. Therefore, the process proceeds to the step S1318 to provide a tray-full warning across the plurality of stackers. On the other hand, the case where automatic selection of the sheet discharge destination other than the stackers is selected is a case where automatic selection of a sheet discharge destination in the finisher 334 has been set. Therefore, it is judged that the printing system 110 is being used in a situation where the user desires to automatically select a sheet discharge destination suitable for the finishing function, and the process proceeds to the step S1312 so as to give priority to outputting a sheet without changing the current sheet discharge destination setting.

In the present embodiment, in the case where the sheet discharge destination is automatically selected from within the finisher 334, the sheet discharge destination is controlled so as to avoid a sheet discharge destination which has become full. However, this is not limitative, but the control may be performed in the same manner as performed as to the stackers. Further, the configuration may be such that in a case where a device setting is made in advance for causing a sheet discharge destination to be automatically selected from within the finisher 334, the user is allowed to select the sheet discharge destination for the sake of tray-full control.

Figure 15B:
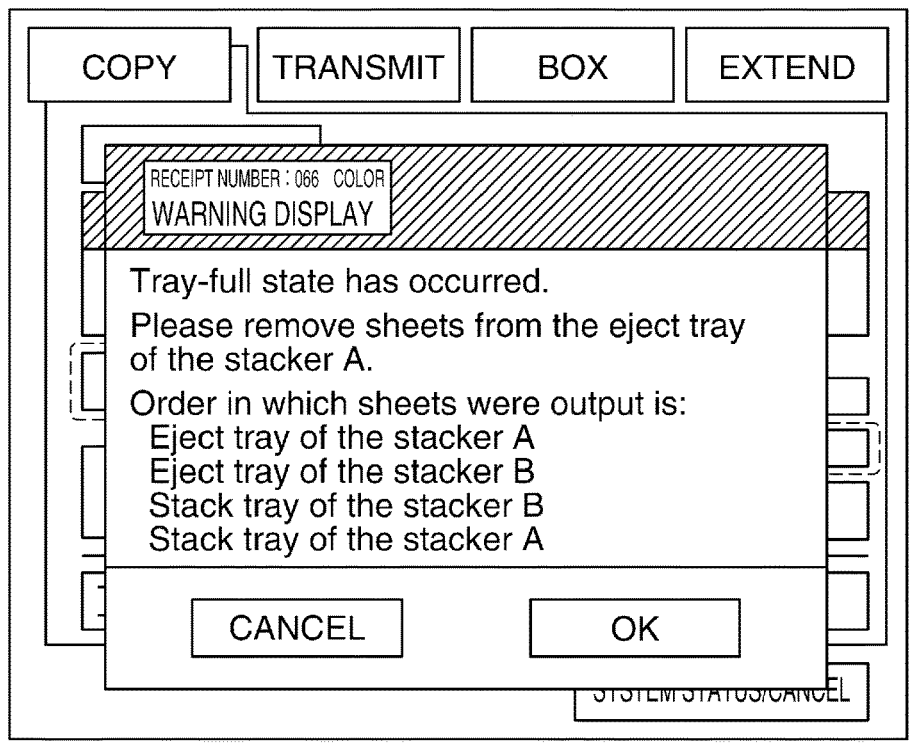
FIG. 15B is a diagram showing another example of a warning display displayed on the touch panel section of the printing apparatus in another step in FIG. 13B of the tray-full control process.

In the step S1318, the controller 205 extracts the output completion times stored in the HDD 209 in the steps S1202 and S1204, and acquires a discharge order of the stacked printed products. In the following step S1319, the controller 205 displays a warning on the touch panel section 501 of the printing apparatus 120 according to the discharge order acquired in the step S1318. FIG. 15B is a view of an example of the warning display, displayed on the touch panel section 501 by the processing of the step S1319. Note that the "stacker A" and the "stacker B" in FIG. 15B indicate the first stacker 361 and the second stacker 371, respectively, and a "stack tray" indicates the stacking section.

The warning display shown in FIG. 15B has different display contents from those of the warning display shown in FIG. 15A, and prompts the operator to perform an operation for removing the printed products from the corresponding sheet discharge destination by displaying only the sheet discharge destinations and the past discharge order in combination. This enables the operator to easily recognize the order and respective locations of the printed products to be taken out by himself/herself, and it is possible to prevent the operator from make a mistake in selecting the printed product to be taken out. Although in this example, only the sheet discharge destination from which a printed product to be taken out and the past discharge order are displayed in combination as the tray-full warning, further to this, job names and output times of printed products output to each sheet discharge destination may also be displayed at the same time.

In a step S1313, the controller 205 extracts the sheet discharge destination candidates to which the sheets can be output from the sheet discharge destination setting acquired in the step S1305, and determines whether or not the extracted sheet discharge destination candidates include one which enables printing (i.e. a sheet discharge destination to which a printed sheet can be discharged (output)). If there is no sheet discharge destination which enables printing (NO to the step S1313), the controller 205 repeats the determination in the step S1313, and is on standby until a sheet discharge destination is found which enables printing by removing the sheets by the operator's operation according to the warning display. On the other hand, if the extracted sheet discharge destination candidates include one which enables printing (YES to the step S1313), the controller 205 proceeds to a step S1314. Details of the step S1313 will be described hereinafter with reference to FIG. 14.

In the step S1314, the controller 205 cancels the tray-full warning displayed on the touch panel section 501 of the console section 204. In a step S1315, the controller 205 adds the sheet discharge destination to which a sheet can be discharged to the sheet discharge destination candidate list stored in the RAM 208 in the step S1306 to thereby update the list. In the step S1316, the controller 205 sends a print start request including an instruction for causing sheets to be discharged to the sheet discharge destination to which sheets can be discharged, and restarts outputting a sheet (i.e. printing and discharging a sheet), followed by terminating the present process.

Figure 14:
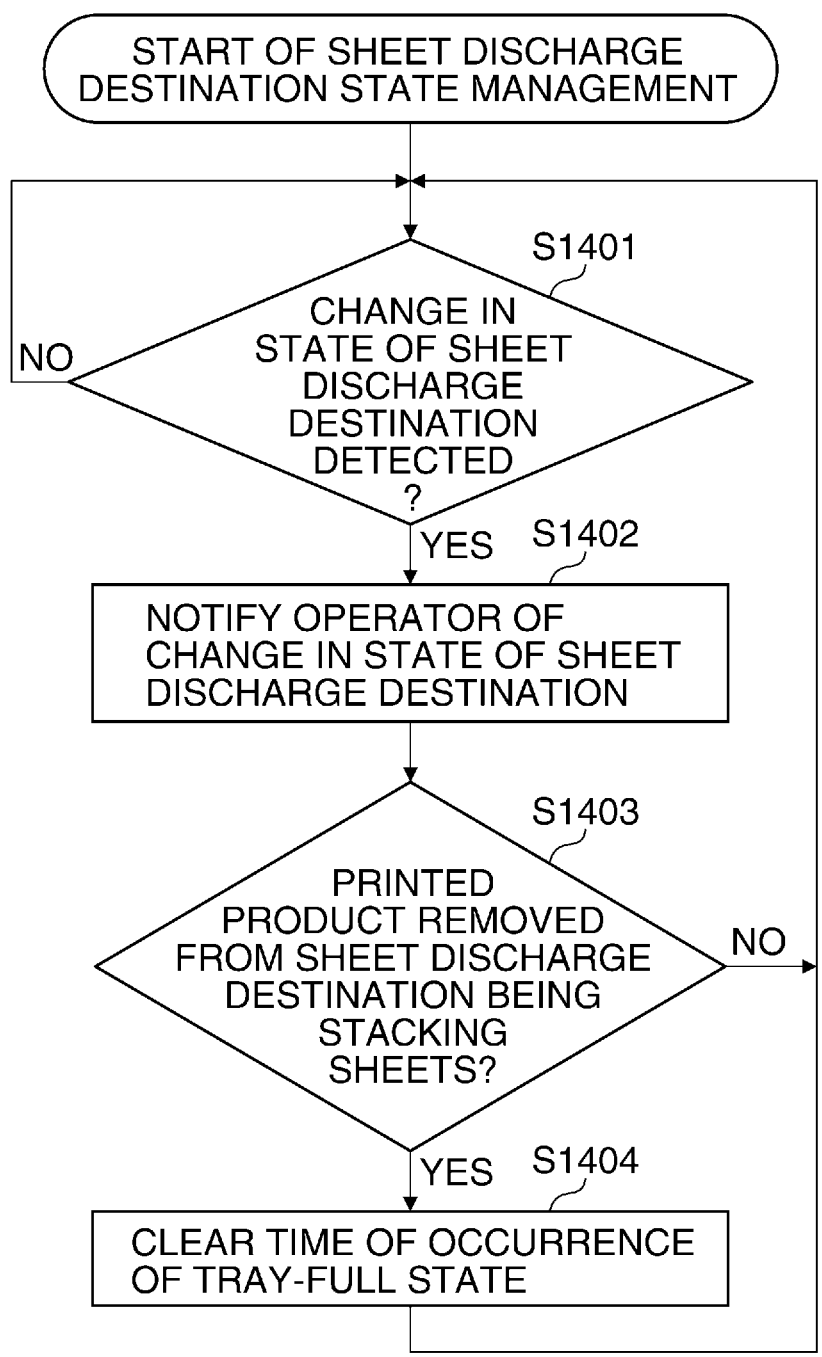
FIG. 14 is a flowchart of a sheet discharge destination state management process performed for determination in a step in FIG. 13B of the tray-full control process.

FIG. 14 is a flowchart of a sheet discharge destination state management process performed in the step S1313 for detecting a sheet discharge destination which enables printing (the stacking sections 365 and 375 and the discharge trays 335 and 336). In a step S1401, the controller 205 determines whether or not a change in the state of the sheet discharge destination is detected from the sheet processing apparatus 130. If a change in the state of the sheet discharge destination is not detected (NO to the step S1401), the controller 205 is on standby until a change in the state of the sheet discharge destination is detected, whereas if a change in the state of the sheet discharge destination is detected (YES to the step S1401), the controller 205 proceeds to a step S1402.

In the step S1402, the controller 205 notifies the operator via the console section 204 that the state of the sheet discharge destination has been changed based on the state detected in the step S1401. In the following step S1403, the controller 205 determines whether or not the detected change in the state includes removal of the printed product from the sheet discharge destination stacking the sheets of the printed product. If the detected change in the state includes removal of the printed product from the sheet discharge destination (YES to the step S1403), the controller 205 proceeds to a step S1404, whereas if not, i.e. if the printed product has not been removed from the sheet discharge destination (NO to the step S1403), the controller 205 returns to the step S1401.

In the step S1404, the controller 205 clears the output time stored in the HDD 209 in the step S1204 for the sheet discharge destination from which the printed product has been removed, and then returns to the step S1401. This makes it possible to perform control for updating the output time while detecting whether or not the tray-full state is cleared.

As described above, in the present embodiment, when the tray-full state occurs, a sheet discharge destination holding a printed product to be removed is displayed on the touch panel section 501 of the printing apparatus 120 according to the job setting without performing the control of user authentication or the like irrespective of a user who has input the job. More specifically, when the tray-full state occurs in an environment in which a job is input with the setting set to a fixed sheet discharge destination, a warning is displayed to prompt the operator to remove a printed product from the sheet discharge destination to which sheets are being output. Further, in an environment in which a job is input with a setting of automatic selection of a sheet discharge destination from within the finisher 334, when the tray-full state occurs, a warning is displayed which makes it possible to continue outputting sheets according to the finishing setting without making the user conscious of sheet discharge destination selection.

Further, in an environment in which a job is input with the setting of automatic selection of the sheet discharge destination between the stackers, when the tray-full state occurs, a warning is displayed which prompts the operator to remove printed products from a sheet discharge destination to which sheets were output earliest of all automatically selectable sheet discharge destinations. That is, the printed product to be removed is displayed to the operator according to the job settings input by the user, whereby it is possible to perform a proper operation in various situations which can be expected of the POD environment. For example, in an environment in which a person who inputs a job is different from a person who conveys printed products, an environment in which one operator continuously performs printing of a large amount of pages, and an environment in which a plurality of operators share the printing system 110, it is possible to perform the optimum operation.

Next, a description will be given of a variation of the tray-full control process performed when the tray-full state occurs in the first and second large-capacity stackers 361 and 371 with reference to FIGS. 16A and 16B.

Figure 16A:
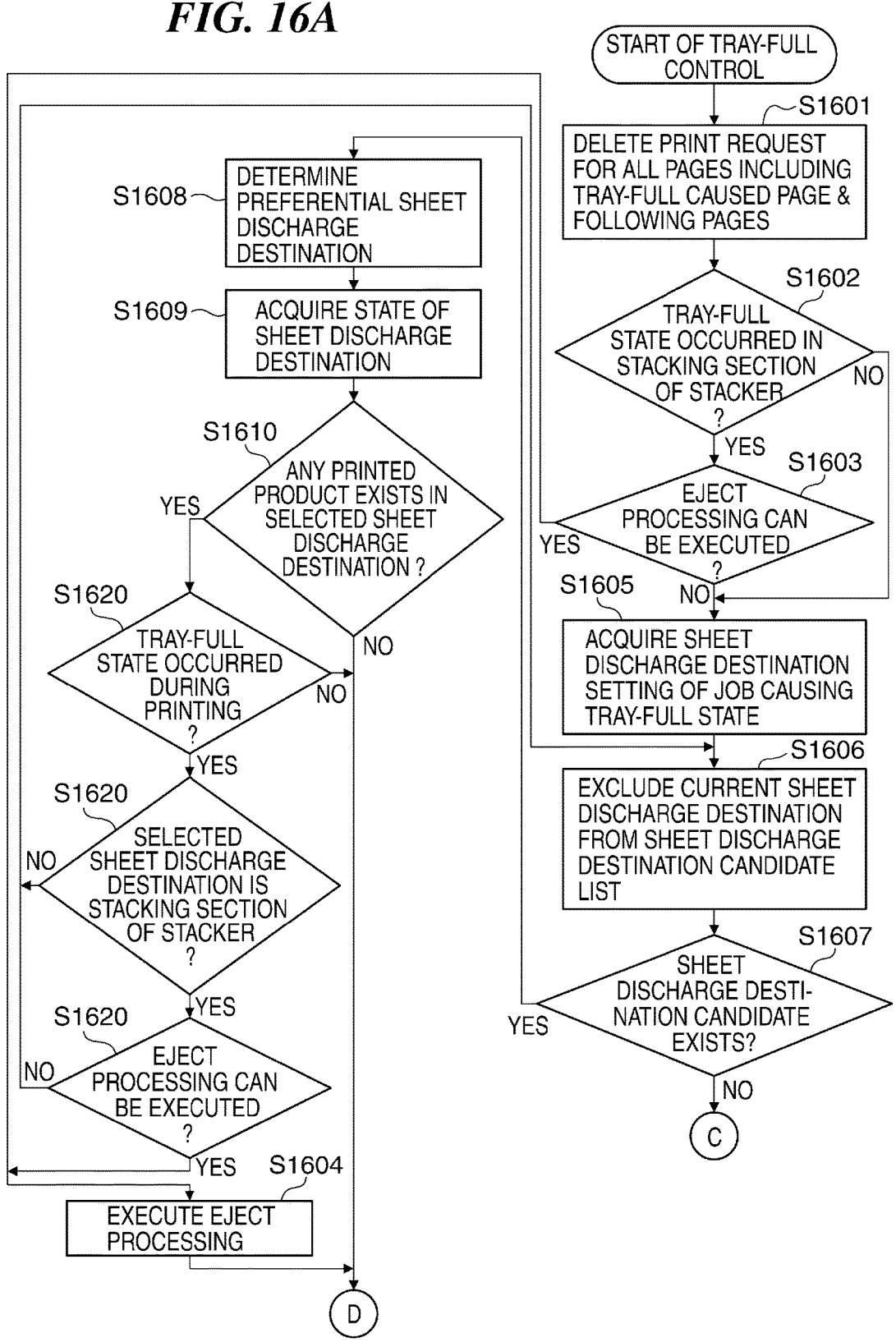
FIG. 16A is a flowchart a flowchart of a variation of the tray-full control process performed in the print instruction control process in FIG. 11 and the job management control process in FIG. 12.
Figure 16B:
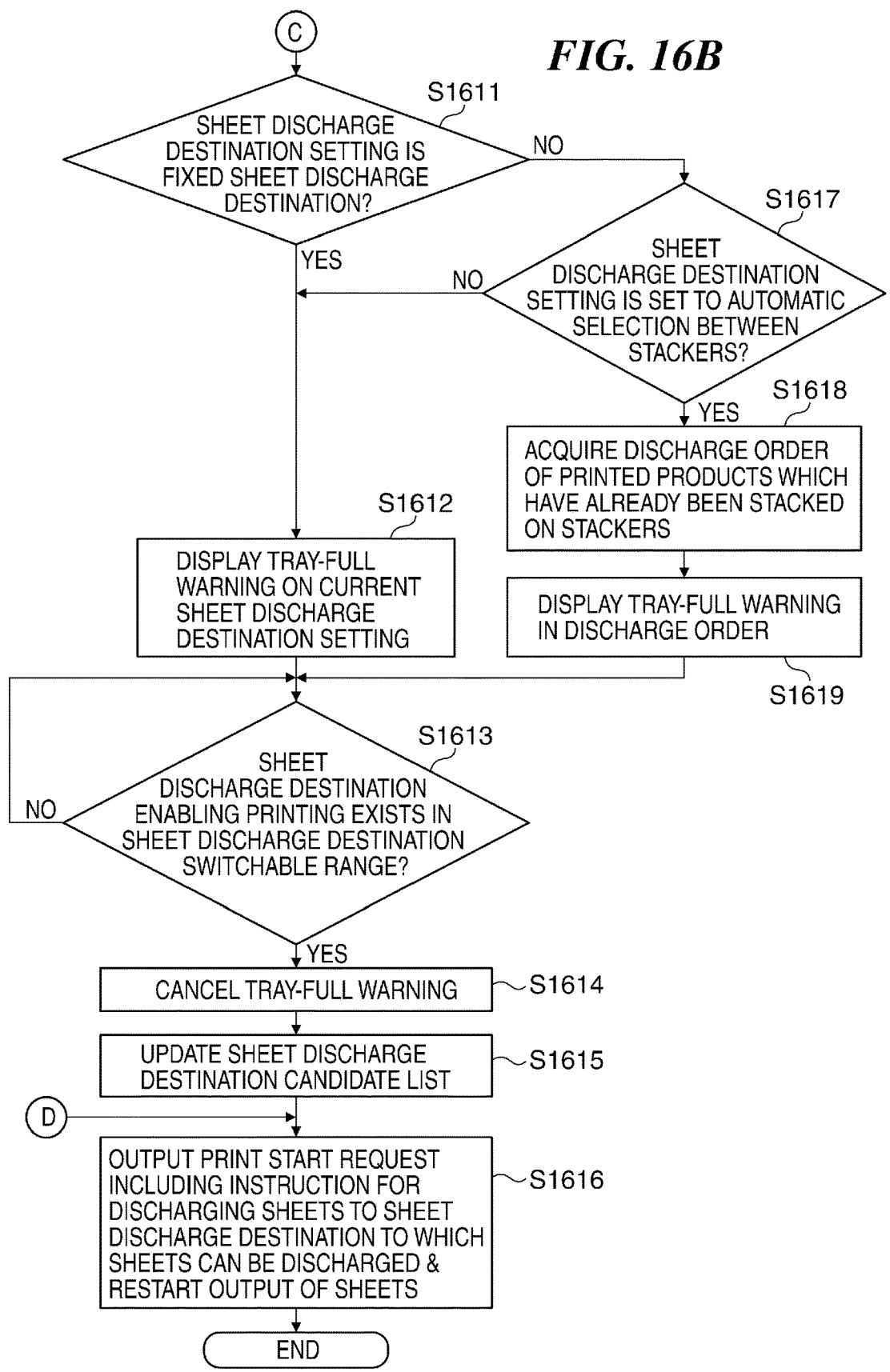
FIG. 16B is a continuation of FIG. 16A.

FIGS. 16A and 16B are a flowchart of the variation of the tray-full control process performed when the tray-full state occurs in the first and second large-capacity stackers 361 and 371. Steps S1601 to S1609, and S1611 to S1619 are the same as the steps S1301 to S1309, and S1311 to S1319 of the tray-full control process in FIGS. 13A and 13B, and hence description thereof is omitted.

In a step S1610, the controller 205 determines based on the state of the sheet discharge destination, acquired in the step S1609, whether or not any printed product is stacked thereon. If no printed product is stacked thereon (NO to the step S1610), the controller 205 proceeds to the step S1616, whereas if any printed product is stacked thereon (YES to the step S1610), the controller 205 proceeds to a step S1620. In the step S1620, the controller 205 determines whether or not the tray-full state has occurred during printing (i.e. during execution of the job). If the tray-full state has occurred during printing (YES to the step S1620), the controller 205 proceeds to a step S1621. On the other hand, if the tray-full state has not occurred during printing (NO to the step S1620), it means that the tray-full state has occurred before the start of printing (before execution of the job), and hence the controller 205 proceeds to the step S1616.

In the step S1621, the controller 205 determines whether or not the selected sheet discharge destination is a stacking section of the stacker. If the selected sheet discharge destination is a stacking section of the stacker (YES to the step S1621), the controller 205 proceeds to a step S1622, whereas if the selected sheet discharge destination is not a stacking section of the stacker (NO to the step S1621), the controller 205 returns to the step S1606 so as to search for another sheet discharge destination. In the step S1622, the controller 205 acquires the state of the eject tray of the stacker including the selected stacking section, and determines whether or not the eject tray can be ejected. If the eject tray can be ejected (YES to the step S1622), the controller 205 proceeds to the step S1604 so as to execute eject processing, whereas if the eject tray cannot be ejected (NO to the step S1622), the controller 205 returns to the step S1606 so as to search for another sheet discharge destination.

According to the above-described control, when changing the sheet discharge destination due to occurrence of the tray-full state, it is possible to prevent a printed product from being mixed with a printed product of another job. Further, by performing the control as in the step S1620, in a case where the tray-full state has occurred before the start of printing, although a printed product as a result of printing and outputting from a first page thereof may be mixed with another printed product already output in the selected sheet discharge destination, it is possible to give the priority to stacking of sheets as much as possible, and on the other hand, in a case where a sheet discharge destination for stacking a printed product thereon is changed during printing, it is possible to prevent the printed product from being mixed with another printed product. Thus, it is possible to easily output one job as a continuously printed product.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™, a flash memory device, a memory card, and the like.

This application claims the benefit of Japanese Patent Application No. 2014-163614 filed Aug. 11, 2014, which is hereby incorporated by reference herein in its entirety.

What is claimed is:

1. A printing system, comprising:
a printing apparatus including a printer configured to print an image on a sheet based on a print job;
a plurality of sheet stackers configured to receive a sheet from the printing apparatus, each of the plurality of sheet stackers having a sensor that detects a full load of sheets; and
processing circuitry configured to:
determine a sheet stacker as a sheet discharge destination, to which the sheet subjected to printing by the printer is to be discharged, from among the plurality of sheet stackers based on a setting set on the print job;
in a case where the sensor detects a full load of sheets of the sheet stacker determined as the sheet discharge destination, search for another sheet stacker which is available for sheet discharge;
in a case where the another sheet stacker which is available for sheet discharge is found by the search, change the sheet discharge destination to the another sheet stacker; and
after changing the sheet discharge destination from the first sheet stacker to the another sheet stacker, in a case where there is no sheet stacker which is available for sheet discharge when the sensor detects a full load of sheets of the another sheet stacker, acquire a discharge order of printed sheets that have been discharged to the sheet stackers and, based on the acquired discharge order, display on a display a message prompting a user to remove sheets from a sheet stacker having the earliest-discharged sheet among the sheet stackers on which the sheets subjected to printing based on the print job are stacked,
wherein the print job has a setting of first discharge destination information representing that the sheet discharge destination is to be determined automatically, or a setting of second discharge destination information representing any one of the plurality of sheet stackers, and
wherein in a case where the setting of the first discharge destination information is set in the print job, the processing circuitry allows the printer to continue the printing on sheets by changing the sheet discharge destination to the another sheet stacker, and in a case where the setting of the second discharge destination information is set in the print job, the processing circuitry stops the print job to be executed without changing the sheet discharge destination to another sheet stacker and causes the display to display a message prompting the user to remove sheets from the sheet stacker represented by the second discharge destination information.

2. The printing system according to claim 1, wherein the plurality of sheet stackers include a sheet stacker which is able to be lifted and to be lowered.

3. The printing system according to claim 1, wherein the processing circuitry is further configured to:
judge whether a sheet stacker selected as the sheet discharge destination is able to be moved to a position for allowing a user to remove the sheet; and
move the sheet stacker selected as the sheet discharge destination to the position, before the sheet is output to the sheet stacker selected as the sheet discharge destination.

4. The printing system according to claim 1, wherein in a case where the another sheet stacker is found by the search, the processing circuitry determines whether or not the sheets subjected to printing by the printer are already stacked on the another sheet stacker, and in a case where the sheets subjected to printing are already stacked on the another sheet stacker, the processing circuitry stops stacking the sheets subjected to printing by the printer on the already-stacked sheets.

5. A method, implemented by processing circuitry, of controlling a printing system including a printing apparatus including a printer configured to print an image on a sheet based on a print job, and a plurality of sheet stackers configured to receive a sheet from the printing apparatus, each of the plurality of sheet stackers having a sensor that detects a full load of sheets, the method comprising:
determining a sheet stacker as a sheet discharge destination, to which the sheet subjected to printing by the printer is to be discharged, from among the plurality of sheet stackers based on a setting set on the print job;

searching, in a case where the sensor detects a full load of sheets of the sheet stacker determined as the sheet discharge destination, for another sheet stacker which is available for sheet discharge;

changing, in a case where the another sheet stacker which is available for sheet discharge is found by the searching, the sheet discharge destination to the another sheet stacker; and after changing the sheet discharge destination from the first sheet stacker to the another sheet stacker, in a case where there is no sheet stacker which is available for sheet discharge when the sensor detects a full load of sheets of the another sheet stacker, acquiring a discharge order of printed sheets that have been discharged to the sheet stackers and, based on the acquired discharge order, displaying on a display a message prompting a user to remove sheets from a sheet stacker having the earliest-discharged sheet among the sheet stackers on which the sheets subjected to printing based on the print job are stacked, wherein the print job has a setting of first discharge destination information representing that the sheet discharge destination is to be determined automatically, or a setting of second discharge destination information representing any one of the plurality of sheet stackers, and wherein in a case where the setting of the first discharge destination information is set in the print job, the processing circuitry allows the printer to continue the printing on sheets by changing the sheet discharge destination to the another sheet stacker, and in a case where the setting of the second discharge destination information is set in the print job, the processing circuitry stops the print job to be executed without changing the sheet discharge destination to another sheet stacker and causes the display to display a message prompting the user to remove sheets from the sheet stacker represented by the second discharge destination information.

6. A non-transitory computer readable storage medium for storing a computer program for implementing a method of controlling a printing system including a printing apparatus including a printer configured to print an image on a sheet based on a print job, and a plurality of sheet stackers configured to receive a sheet from the printing apparatus, each of the plurality of sheet stackers having a sensor that detects a full load of sheets, the method comprising:

determining a sheet stacker as a sheet discharge destination, to which the sheet subjected to printing by the printer is to be discharged, from among the plurality of sheet stackers based on a setting set on the print job;

searching, in a case where the sensor detects a full load of sheets of the sheet stacker determined as the sheet discharge destination, for another sheet stacker which is available for sheet discharge;

changing, in a case where the another sheet stacker which is available for sheet discharge is found by the searching, the sheet discharge destination to the another sheet stacker; and after changing the sheet discharge destination from the first sheet stacker to the another sheet stacker, in a case where there is no sheet stacker which is available for sheet discharge when the sensor detects a full load of sheets of the another sheet stacker, acquiring a discharge order of printed sheets that have been discharged to the sheet stackers and, based on the acquired discharge order, displaying on a display a message prompting a user to remove sheets from a sheet stacker having the earliest-discharged sheet among the sheet stackers on which the sheets subjected to printing based on the print job are stacked, wherein the print job has a setting of first discharge destination information representing that the sheet discharge destination is to be determined automatically, or a setting of second discharge destination information representing any one of the plurality of sheet stackers, and wherein in a case where the setting of the first discharge destination information is set in the print job, the printer is allowed to continue the printing on sheets by changing the sheet discharge destination to the another sheet stacker, and in a case where the setting of the second discharge destination information is set in the print job, the print job to be executed is stopped without changing the sheet discharge destination to another sheet stacker and the display is caused to display a message prompting the user to remove sheets from the sheet stacker represented by the second discharge destination information.

* * * * *